US012619694B2

(12) United States Patent
Hirata et al.

(10) Patent No.: US 12,619,694 B2
(45) Date of Patent: May 5, 2026

(54) INFORMATION PROCESSING DEVICE, INFORMATION PROCESSING SYSTEM, INFORMATION PROCESSING METHOD, AND NON-TRANSITORY COMPUTER-READABLE MEDIUM FOR ASSISTING A USER AT A TIME OF EXIT

(71) Applicant: NEC Corporation, Tokyo (JP)

(72) Inventors: Satoshi Hirata, Tokyo (JP); Hajime Yamashita, Tokyo (JP); Kenta Aino, Tokyo (JP); Yuto Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 189 days.

(21) Appl. No.: 18/033,307

(22) PCT Filed: Nov. 6, 2020

(86) PCT No.: PCT/JP2020/041563
§ 371 (c)(1),
(2) Date: Apr. 21, 2023

(87) PCT Pub. No.: WO2022/097278
PCT Pub. Date: May 12, 2022

(65) Prior Publication Data
US 2023/0385389 A1 Nov. 30, 2023

(51) Int. Cl.
*G06F 21/32* (2013.01)
*G07C 9/37* (2020.01)

(52) U.S. Cl.
CPC .............. *G06F 21/32* (2013.01); *G07C 9/37* (2020.01)

(58) Field of Classification Search
CPC .................................................. G06F 21/32
See application file for complete search history.

(56) References Cited

U.S. PATENT DOCUMENTS 6,069,555 A * 5/2000 Skitek ...................... G07C 9/23
700/1
2004/0172403 A1 * 9/2004 Steele ...................... G07C 9/00
(Continued)

FOREIGN PATENT DOCUMENTS

JP 2003-132381 A 5/2003
JP 2014-085893 A 5/2014
(Continued)

OTHER PUBLICATIONS

JP Office Action for JP Application No. 2022-560605, mailed on Oct. 29, 2024 with English Translation.
(Continued)

*Primary Examiner* — Ponnoreay Pich
(74) *Attorney, Agent, or Firm* — .Sughrue Mion, PLLC

(57) ABSTRACT

An information processing device (1) includes: a first biometric information acquisition unit (11) that acquires biometric information about a user in a facility in which a plurality of seats are disposed; a first authentication control unit (12) that controls first biometric authentication of the acquired biometric information against registered biometric information about a plurality of persons; a determination unit (13) that determines, based on seat information in which a seat position of each person is associated with the registered biometric information, a seat position of the user when the first biometric authentication succeeds; a decision unit (14) that decides assistance information for assisting in behavior at a time of entry or at a time of exit of the user, based on the seat position; and an output unit (15) that outputs the assistance information.

12 Claims, 19 Drawing Sheets

(56)     References Cited

U.S. PATENT DOCUMENTS

| | | | | |
|---|---|---|---|---|
| 2004/0199785 | A1* | 10/2004 | Pederson | G08B 13/19663 |
| | | | | 340/293 |
| 2010/0109861 | A1* | 5/2010 | Shah | G06Q 50/14 |
| | | | | 340/522 |
| 2018/0350171 | A1* | 12/2018 | Weston | G07C 9/37 |
| 2019/0392659 | A1* | 12/2019 | Seenivasagam | H04W 12/06 |
| 2023/0385389 | A1* | 11/2023 | Hirata | G07C 9/37 |

FOREIGN PATENT DOCUMENTS

| | | |
|---|---|---|
| JP | 2017-207817 A | 11/2017 |
| JP | 2018-142080 A | 9/2018 |

OTHER PUBLICATIONS

International Search Report for PCT Application No. PCT/JP2020/041563, mailed on Dec. 15, 2020.
Masako Inoue et al., "The People Flow Simulation", Journal of Information Processing Society of Japan, vol. 58, No. 7, pp. 578-581, Jun. 15, 2017.

* cited by examiner

1

INFORMATION PROCESSING DEVICE, INFORMATION PROCESSING SYSTEM, INFORMATION PROCESSING METHOD, AND NON-TRANSITORY COMPUTER-READABLE MEDIUM FOR ASSISTING A USER AT A TIME OF EXIT

This application is a National Stage Entry of PCT/JP2020/041563 filed on Nov. 6, 2020, the contents of all of which are incorporated herein by reference, in their entirety.

TECHNICAL FIELD

The present invention relates to an information processing device, an information processing system, an information processing method, and a non-transitory computer-readable medium, and particularly relates to an information processing device, an information processing system, an information processing method, and a non-transitory computer-readable medium that assist in behavior at a time of entry or at a time of exit in a facility.

BACKGROUND ART

Patent Literature 1 discloses a technique for a service providing system for improving a service to be provided to an attendant. The service providing system stores, in a storage unit, a scheduled attendant and his/her seat in association with each other in a reservation for a reserved seat in event watching. Then, when the service providing system receives a plurality of pieces of order information, the service providing system performs arithmetic processing on the order information, generates a sales route in which a salesclerk can efficiently move, and transmits order reception information to information communication equipment possessed by the salesclerk.

CITATION LIST

Patent Literature

[Patent Literature 1] Japanese Unexamined Patent Application Publication No. 2018-142080

SUMMARY OF INVENTION

Technical Problem

Herein, there is a problem that it is difficult to guide preferable behavior before a person takes a seat in his/her seat in a facility having many seats, and behavior at a time of exit from the facility. Note that Patent Literature 1 cannot solve this problem.

The present disclosure has been made in order to solve such a problem, and an object of the present disclosure is to provide an information processing device, an information processing system, an information processing method, and a non-transitory computer-readable medium for achieving assistance with entry behavior or assistance with exit behavior according to a seat position of a user.

Solution to Problem

An information processing device according to the present disclosure includes:

a first biometric information acquisition means for acquiring biometric information about a user in a facility in which a plurality of seats are disposed;

a first authentication control means for controlling first biometric authentication of the acquired biometric information against registered biometric information about a plurality of persons;

a determination means for determining, based on seat information in which a seat position of each person is associated with the registered biometric information, the seat position of the user when the first biometric authentication succeeds;

a decision unit that decides assistance information for assisting in behavior at a time of entry or at a time of exit of the user, based on the seat position; and an output means for outputting the assistance information.

An information processing system according to the present disclosure includes:

a first authentication terminal installed in a facility in which a plurality of seats are disposed; and an information processing device, wherein the information processing device acquires biometric information about a user from the first authentication terminal, controls first biometric authentication of the acquired biometric information against registered biometric information about a plurality of persons, determines, based on seat information in which a seat position of each person is associated with the registered biometric information, a seat position of the user when the first biometric authentication succeeds, decides assistance information for assisting in behavior at a time of entry or at a time of exit of the user, based on the seat position, and outputs the assistance information.

An information processing method according to the present disclosure includes, by a computer:

acquiring biometric information about a user in a facility in which a plurality of seats are disposed;

controlling first biometric authentication of the acquired biometric information against registered biometric information about a plurality of persons;

determining, based on seat information in which a seat position of each person is associated with the registered biometric information, a seat of the user when the first biometric authentication succeeds;

deciding assistance information for assisting in behavior at a time of entry or at a time of exit of the user, based on the seat; and outputting the assistance information.

A non-transitory computer-readable medium stores an information processing program according to the present disclosure causing a computer to execute:

processing of acquiring biometric information about a user in a facility in which a plurality of seats are disposed;

processing of controlling first biometric authentication of the acquired biometric information against registered biometric information about a plurality of persons;

processing of determining, based on seat information in which a seat position of each person is associated with the registered biometric information, a seat of the user when the first biometric authentication succeeds;

processing of deciding assistance information for assisting in behavior at a time of entry or at a time of exit of the user, based on the determined seat; and processing of outputting the assistance information.

Advantageous Effects of Invention

The present disclosure is able to provide an information processing device, an information processing method, and a non-transitory computer-readable medium that output assistance information for assisting in entry behavior or exit behavior according to a position of a seat of a user.

EXAMPLE EMBODIMENT

Hereinafter, example embodiments of the present disclosure will be described in detail with reference to drawings. In each of the drawings, the same or corresponding elements will be denoted by the same reference signs, and duplicate description will be omitted depending on need for the sake of clarity of explanation.

First Example Embodiment

Figure 1:
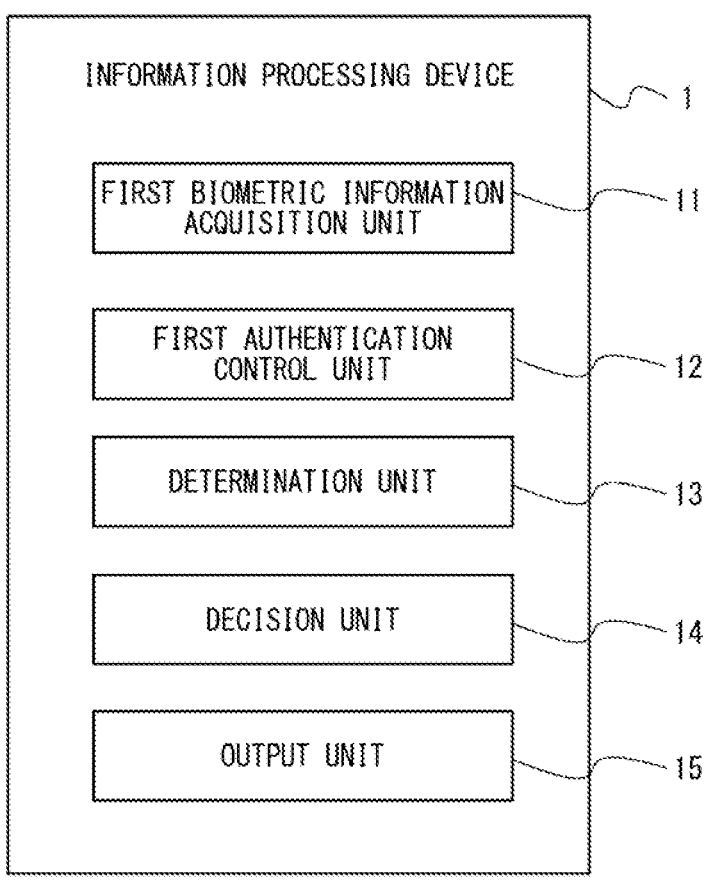
FIG. 1 is a block diagram illustrating a configuration of an information processing device according to a first example embodiment.

FIG. 1 is a block diagram illustrating a configuration of an information processing device 1 according to a first example embodiment. The information processing device 1 is an information processing device for outputting assistance information that assists a user in behavior at a time of entry or at a time of exit in a facility in which a plurality of seats are disposed. Herein, the information processing device 1 is connected to a network (not illustrated). The network may be wired or may be wireless. The information processing device 1 is also connected to a storage device (not illustrated) for storing seat information described below.

The information processing device 1 includes a first biometric information acquisition unit 11, a first authentication control unit 12, a determination unit 13, a decision unit 14, and an output unit 15. The first biometric information acquisition unit 11 acquires first biometric information about a user in a facility in which a plurality of seats are disposed. Herein, the biometric information is face feature information, iris information, fingerprint information, and the like.

The first authentication control unit 12 controls first biometric authentication of the acquired biometric information against registered biometric information about a plurality of persons. Note that, when the registered biometric information is stored in advance in the information processing device 1, the first authentication control unit 12 performs authentication processing. Alternatively, when the registered biometric information is stored in advance in an authentication device outside the information processing device 1, the first authentication control unit 12 causes the authentication device to perform authentication, and acquires an authentication result.

The determination unit 13 determines a seat position of the user, based on seat information in which a seat position of each person is associated with the registered biometric information when the first biometric authentication succeeds. The seat position may be a seat number, or a number of a block that gathers a plurality of seats.

The decision unit 14 decides assistance information for assisting the authenticated user in behavior at a time of entry or at a time of exit, based on the determined seat. The assistance information for assisting in behavior at a time of entry is, for example, information indicating that a seat is located away from a toilet and thus going to the toilet is recommended, and information indicating that a seat is located away from a sports area and thus purchasing binoculars is recommended.

Further, assistance information for assisting in behavior at a time of exit is, for example, information indicating a recommended exit time period. For example, the decision unit 14 may indicate an earlier exit time period for a user in a seat position closer to a gate. Further, the decision unit 14 may decide an exit time period, based on a degree of congestion of a facility. When the facility includes a plurality of gates, the assistance information may be information indicating a recommended exit gate.

The output unit 15 outputs the decided assistance information. The output unit 15 may output the assistance information to a display unit of an authentication terminal installed in the facility, or may transmit (output) the assistance information to an information terminal possessed by the authenticated user.

Figure 2:
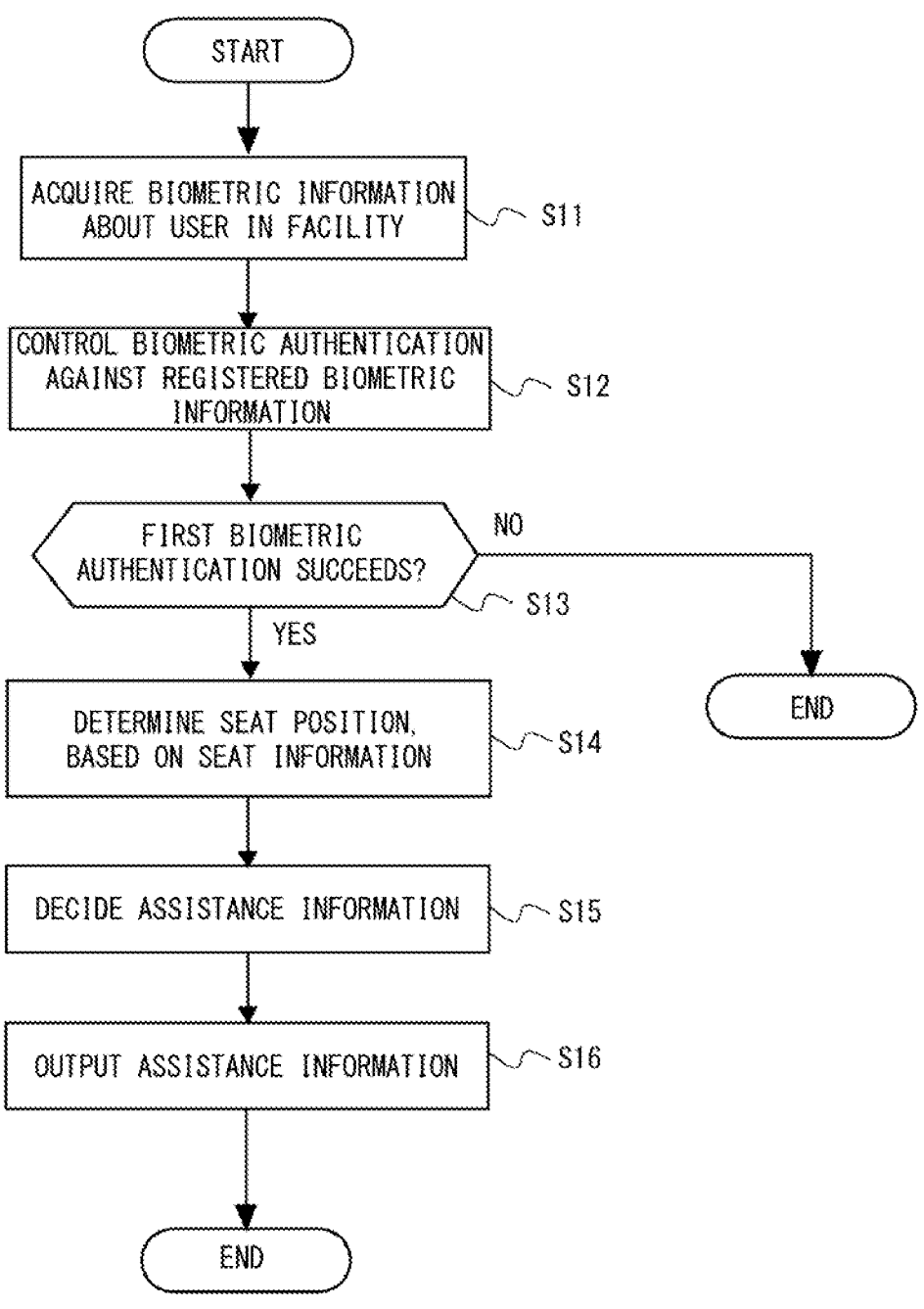
FIG. 2 is a flowchart illustrating a flow of an information processing method according to the first example embodiment.

FIG. 2 is a flowchart illustrating a flow of an information processing method according to the first example embodiment. Note that it is assumed that a seat position of each person is registered in advance in association with biometric information. First, the first biometric information acquisition unit 11 acquires biometric information about a user in a facility (S11). Next, the first authentication control unit 12 controls first biometric authentication of the acquired biometric information against registered biometric information about a plurality of persons (S12). Next, the information processing device 1 judges whether the first biometric authentication succeeds (S13). When the first biometric authentication succeeds, the determination unit 13 determines a seat position of the user, based on seat information in which the seat position of each person is associated with the registered biometric information (S14). Note that, in a case of NO in step S13, the processing ends.

Next, the decision unit 14 decides assistance information for assisting the user in behavior at a time of entry or at a time of exit, based on the seat position (S15). Lastly, the output unit 15 outputs the assistance information (S16).

In such a manner, the determination unit 13 according to the first example embodiment determines a seat position of a user, based on seat information in which a seat position in a facility is associated with registered biometric information. Then, the decision unit 14 decides assistance information that assists in behavior at a time of entry or at a time of exit, based on the determined seat position. In this way, the information that assists in behavior at the time of the entry or at the time of the exit according to a seat of the user can be output.

Note that the information processing device 1 includes a processor, a memory, and a storage device as a configuration that is not illustrated. Further, the storage device stores a computer program in which processing of the information processing method according to the first example embodiment is implemented. Then, the processor reads the computer program from the storage device into the memory, and executes the computer program. In this way, the processor achieves a function of the first biometric information acquisition unit 11, the first authentication control unit 12, the determination unit 13, the decision unit 14, and the output unit 15.

Alternatively, the first biometric information acquisition unit 11, the first authentication control unit 12, the determination unit 13, the decision unit 14, and the output unit 15 may each be achieved by dedicated hardware. Further, a part or the whole of each of the components of each of the devices may be achieved by general-purpose or dedicated circuitry, processor, and the like, or achieved by a combination thereof. A part or the whole of each of the components may be formed by a single chip or formed by a plurality of chips connected to one another via a bus. A part or the whole of each of the components of each of the devices may be achieved by a combination of the above-described circuitry and the like and a program. Further, as the processor, a central processing unit (CPU), a graphics processing unit (GPU), a field-programmable gate array (FPGA), a quantum processor (quantum computer control chip), or the like can be used.

Further, when a part or the whole of each of the components of the information processing device 1 is achieved by a plurality of information processing devices, circuitry, or the like, the plurality of information processing devices, the circuitry, or the like may be arranged in a centralized manner or a distributed manner. For example, the information processing devices, the circuitry, and the like may be achieved as a form in which those are connected with each other via a client server system, a cloud computing system, or the like. Further, the function of the information processing device 1 may be provided in a software as a service (SaaS) form.

Second Example Embodiment

A second example embodiment is a specific example of the first example embodiment described above. The second example embodiment is a device that presents an appropriate exit time to a user in a facility X in which a plurality of seats are disposed.

Figure 3:
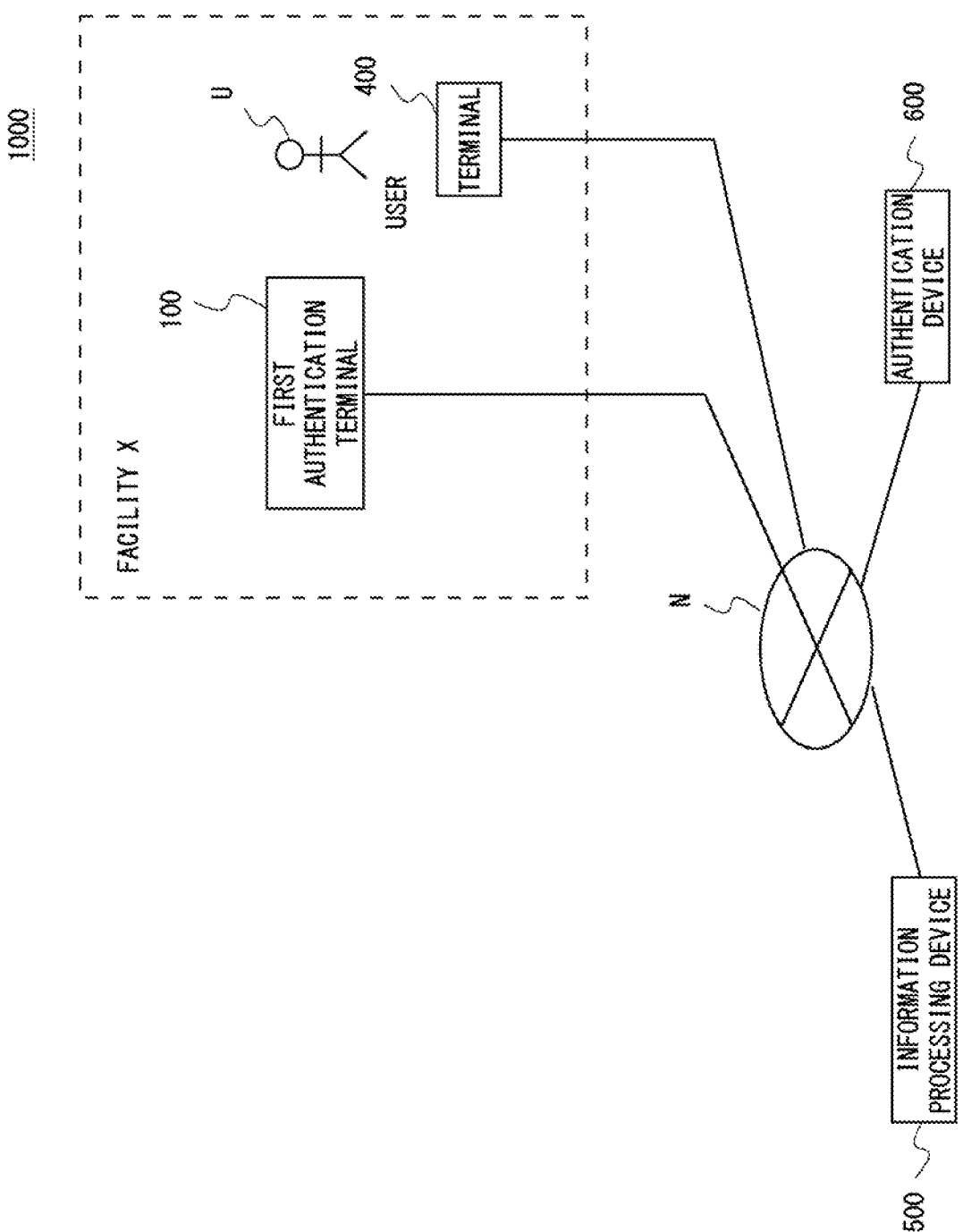
FIG. 3 is a block diagram illustrating a configuration of an information processing system according to a second example embodiment.

FIG. 3 is a block diagram illustrating a configuration of an information processing system 1000 according to the second example embodiment. The information processing system 1000 is an information system for outputting assistance information for assisting in exit from the facility X in which the plurality of seats are disposed. The information processing system 1000 includes a first authentication terminal 100, an information processing device 500, and an authentication device 600. Further, the first authentication terminal 100, the information processing device 500, and the authentication device 600 are connected to one another via a network N. Herein, the network N is a wired or wireless communication line. Note that, in the following description, it is assumed that biometric authentication is face authentication and biometric information is face feature information, but another technique using a captured image can be applied to the biometric authentication and the biometric information. For example, the biometric information may use data (feature value) calculated from a physical feature unique to an individual such as a fingerprint, a voiceprint, a vein, a retina, and a pattern of an iris of a pupil.

The authentication device 600 is an information processing device that stores face feature information about a plurality of persons. Further, in response to a face authentication request being received from the outside, the authentication device 600 performs a comparison between a face image or face feature information included in the request and face feature information about each user, and returns a comparison result (authentication result) to a request source.

Figure 4:
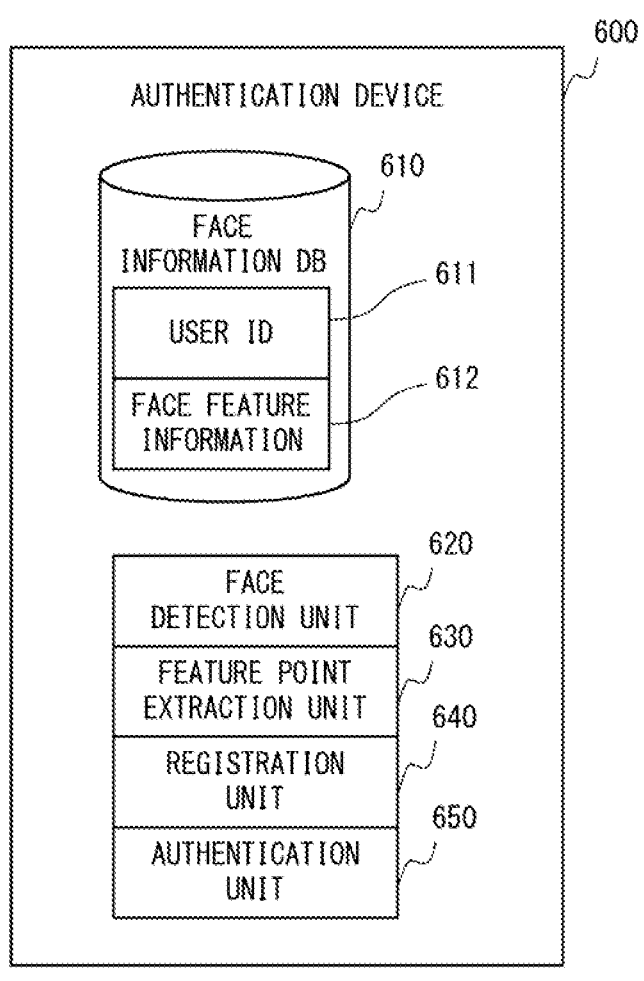
FIG. 4 is a block diagram illustrating a configuration of an authentication device according to the second example embodiment.

FIG. 4 is a block diagram illustrating a configuration of the authentication device 600 according to the second example embodiment. The authentication device 600 includes a face information database (DB) 610, a face detection unit 620, a feature point extraction unit 630, a registration unit 640, and an authentication unit 650. The face information DB 610 stores a user ID 611 and face feature information 612 of the user ID in association with each other. The face feature information 612 is a group of feature points extracted from a face image. Note that the authentication device 600 may delete the face feature information 612 in the face information DB 610 in response to a request from a registered user of the face feature information 612. Alternatively, the authentication device 600 may delete the face feature information 612 after a predetermined period has elapsed from registration.

The face detection unit 620 detects a face area included in a registration image for registering face information, and outputs the face area to the feature point extraction unit 630. The feature point extraction unit 630 extracts a feature point from the face area detected by the face detection unit 620, and outputs face feature information to the registration unit 640. Further, the feature point extraction unit 630 extracts a feature point included in a face image received from the information processing device 500, the first authentication terminal 100, or the like, and outputs face feature information to the authentication unit 650.

The registration unit 640 newly issues the user ID 611 at a time of registration of the face feature information. The registration unit 640 registers, in the face information DB 610, the issued user ID 611 and the face feature information 612 extracted from the registration image in association with each other. Note that the registration unit 640 notifies the first authentication terminal 100 or the information processing device 500 of the user ID 611 after the registration.

The authentication unit 650 performs face authentication using the face feature information 612. Specifically, the authentication unit 650 performs a comparison between the face feature information extracted from the face image and the face feature information 612 in the face information DB 610. The face feature information 612 is also referred to as registered face feature information. When the comparison succeeds, the authentication unit 650 determines the user ID 611 being associated with the compared face feature information 612. The authentication unit 650 returns presence or absence of coincidence of the face feature information as a face authentication result to the information processing device 500. Presence or absence of coincidence of the face feature information is associated with whether authentication succeeds or fails. Note that the coincidence (presence of coincidence) of the face feature information refers to a case where a degree of coincidence is equal to or more than a predetermined value. Further, when face authentication succeeds, it is assumed that a face authentication result includes a determined user ID.

Note that the authentication unit 650 does not need to attempt a comparison among all pieces of the face feature information 612 in the face information DB 610. For example, the authentication unit 650 may preferentially attempt a comparison between pieces of face feature information being registered in a period from a day on which a face authentication request is received until several days ago. In this way, a comparison speed may improve. Further, when the preferential comparison described above fails, a comparison with all remaining pieces of the face feature information may be performed.

Next, the first authentication terminal 100 is an information processing device installed in the facility X in which the plurality of seats are disposed. When the facility X is a stadium, the first authentication terminal 100 may be a signage device installed in a seat area, a concourse, and the like. Further, the first authentication terminal 100 may be installed in an entrance hall, in front of an elevator, in a lobby, and the like.

The first authentication terminal 100 makes a registration request for a seat position and face feature information about a user U. Further, the first authentication terminal 100 makes a face authentication request at a time of exit after the seat position and the face feature information are registered. The registration request may be made at a time of entry of the user U. Further, instead of the first authentication terminal 100, a terminal that makes a registration request and a terminal that makes an authentication request may be installed in the facility X. Furthermore, a terminal 400 described below may include a function of making a registration request or an authentication request. In such a case, the registration request may be made before entry to the facility X.

Figure 5:
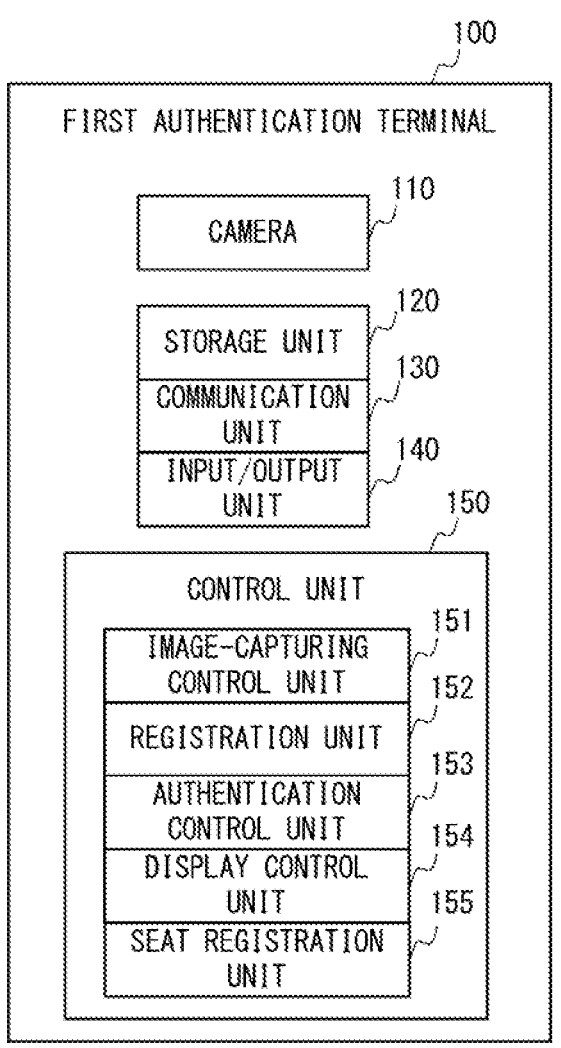
FIG. 5 is a block diagram illustrating a configuration of a first authentication terminal according to the second example embodiment.

FIG. 5 is a block diagram illustrating a configuration of the first authentication terminal 100 according to the second example embodiment. The first authentication terminal 100 includes a camera 110, a storage unit 120, a communication unit 130, an input/output unit 140, and a control unit 150.

The camera 110 is an image-capturing device that performs image-capturing in response to control of the control unit 150. The storage unit 120 is a storage device that stores a program for achieving each function of the first authentication terminal 100. The communication unit 130 is a communication interface with the network N. The input/output unit 140 includes a display device (display unit) such as a screen. The input/output unit 140 may be, for example, a touch panel. The control unit 150 performs control of hardware included in the first authentication terminal 100. The control unit 150 includes an image-capturing control unit 151, a registration unit 152, an authentication control unit 153, a display control unit 154, and a seat registration unit 155.

The image-capturing control unit 151 controls the camera 110, and captures a registration image or an authentication image of the user U in the facility X. The registration image and the authentication image are images including at least a face area of the user U. The image-capturing control unit 151 outputs the registration image to the registration unit 152. Further, the image-capturing control unit 151 outputs the authentication image to the authentication control unit 153.

The registration unit 152 transmits a face information registration request including the registration image to the authentication device 600 via the network N. The registration unit 152 may receive a user ID of the registered user U from the authentication device 600.

The authentication control unit 153 transmits a face authentication request including the authentication image to the information processing device 500 via the network N. The display control unit 154 may receive various pieces of screen data from the information processing device 500 via the network N, and display the received screen data on the input/output unit 140.

The seat registration unit 155 transmits, to the information processing device 500, a seat registration request including the user ID of the user U having face information being registered and a seat position of the user U. Herein, the seat registration unit 155 may acquire a seat position being input to the input/output unit 140 from the user U, or may acquire a seat position by reading a QR code (registered trademark) being displayed on the terminal 400 or a ticket possessed by the user U. The seat registration unit 155 may include not only a seat but also personal information (such as a name, an address, and a company name) about the user U in the seat registration request.

Note that the seat registration unit 155 may transmit a registration image and a seat position to the information processing device 500, and the information processing device 500 may make a face information registration request for the registration image. Further, the seat registration unit 155 may transmit a registration image and a seat position to the authentication device 600, and the authentication device may transmit a user ID and the seat position to the information processing device 500.

Returning to FIG. 3, and description continues. The terminal 400 is an information terminal possessed by the user U. The terminal 400 is, for example, a portable phone terminal, a smartphone, a tablet terminal, a personal computer (PC) including a camera mounted or connected, and the like. The terminal 400 is associated with a user ID or face feature information about the user U. In other words, the terminal 400 is a terminal that can be determined by the user ID or the face feature information in the information processing device 500. For example, the terminal 400 is a terminal into which a user UI has already logged in with his/her user ID. Note that the terminal 400 may include a function of the image-capturing control unit 151, the registration unit 152, the authentication control unit 153, the display control unit 154, and the seat registration unit 155 described above. In other words, a face information registration request, a face authentication request, and a seat registration request may be made by the terminal 400.

The information processing device 500 is an information processing device for assisting in exit behavior of the user U from the facility X. The information processing device 500 may be made redundant by a plurality of servers, or each functional block may be achieved by a plurality of computers.

Figure 6:
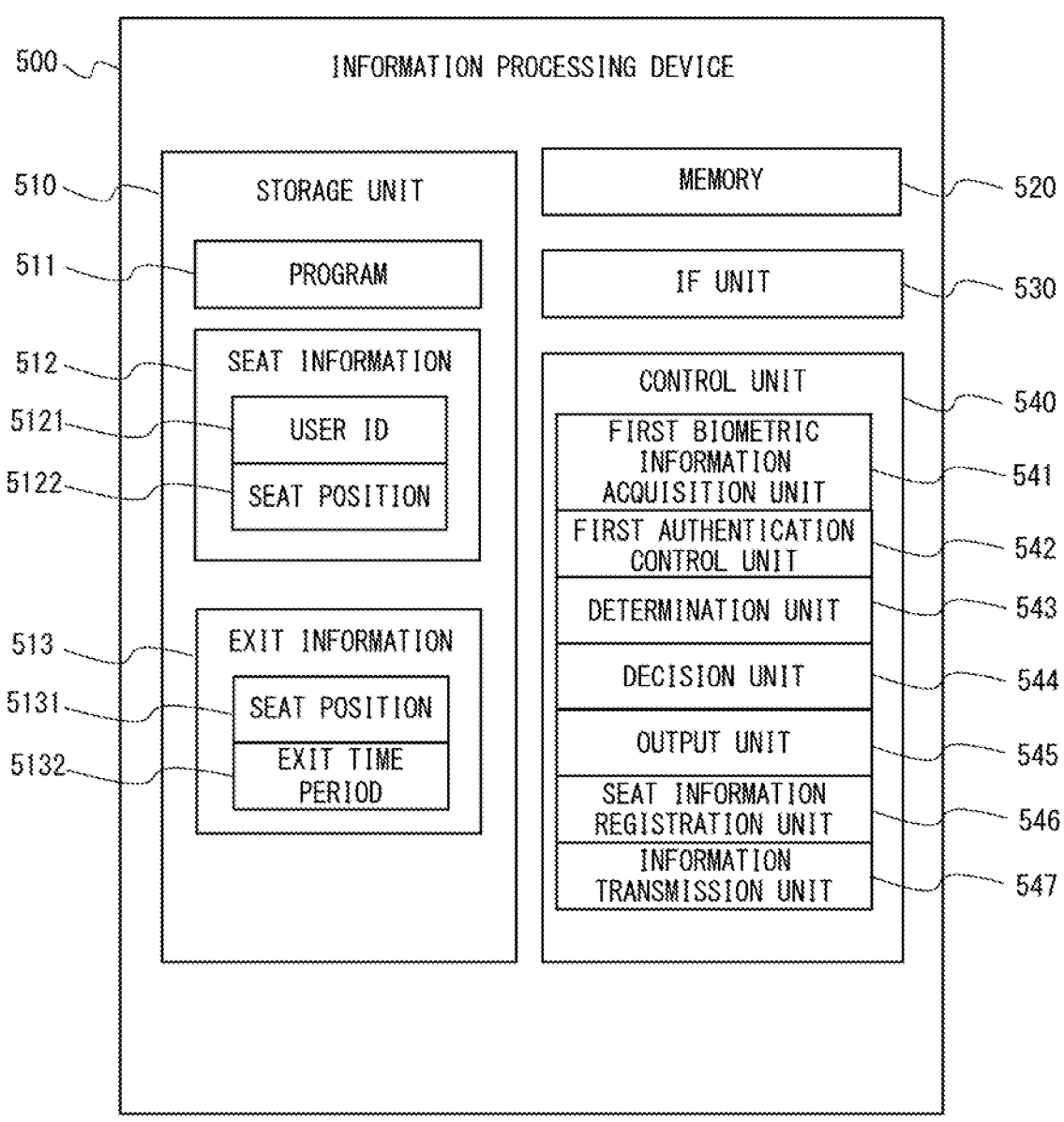
FIG. 6 is a block diagram illustrating a configuration of an information processing device according to the second example embodiment.

Next, the information processing device 500 will be described in detail. FIG. 6 is a block diagram illustrating a configuration of the information processing device according to the second example embodiment. The information processing device 500 includes a storage unit 510, a memory 520, an interface (IF) unit 530, and a control unit 540. The storage unit 510 is one example of a storage device such as a hard disk and a flash memory. The storage unit 510 stores a program 511, seat information 512, and exit information 513. Note that the storage unit 510 may not store the exit information 513. The program 511 is a computer program in which processing of an information processing method according to the second example embodiment is implemented.

The seat information 512 is information for managing a seat position of the user U. In the seat information 512, a user ID 5121 and a seat position 5122 are associated with each other. The user ID 5121 is identification information about the user U. The user ID 5121 is associated with the user ID 611 stored in the face information DB 610 described above. In other words, the face information DB 610 and the seat information 512 are associated with each other via the user ID. The seat information 512 may further include address information such as an address and a zip code of the user U. In this way, the address information and face feature information are associated with each other.

The exit information 513 is information for managing an exit time period of the user U. In the exit information 513, a seat position 5131 and an exit time period 5132 are associated with each other. The seat position 5131 is associated with the seat position 5122. When a taxi is arranged for the user U, the exit time period 5132 may be a riding time of the taxi. In such a case, the exit information 513 may include information indicating a riding position of the taxi. The exit time period 5132 may be set according to a row, a block, or the like in the facility X. Further, when the facility X includes a plurality of gates, the exit information 513 may store a recommended exit gate. Note that, when an exit time period is decided based on a degree of congestion of each area in the facility X, the storage unit 510 may not store the exit information 513.

The memory 520 is a volatile storage device such as a random access memory (RAM), and is a storage area for temporarily holding information during an operation of the control unit 540. The IF unit 530 is a communication interface with the network N.

The control unit 540 is a processor, i.e., a control device that controls each configuration of the information processing device 500. The control unit 540 reads the program 511 from the storage device 510 into the memory 520, and executes the program 511. In this way, the control unit 540 achieves a function of a first biometric information acquisition unit 541, a first authentication control unit 542, a determination unit 543, a decision unit 544, an output unit 545, a seat information registration unit 546, and an information transmission unit 547.

The first biometric information acquisition unit 541 is one example of the first biometric information acquisition unit 11 described above. The first biometric information acquisition unit 11 acquires, as biometric information, a face image included in a face authentication request from the first authentication terminal 100, and outputs the face image to the first authentication control unit 542.

The first authentication control unit 542 is one example of the first authentication control unit 12 described above. The first authentication control unit 542 controls face authentication performed on a face area of the user U included in the face image being received from the first biometric information acquisition unit 541. In other words, the first authentication control unit 542 causes the authentication device 600 to perform face authentication on the face image. For example, the first authentication control unit 542 transmits a face authentication request including the acquired face image to the authentication device 600 via the network N, and receives a face authentication result from the authentication device 600. Note that the first authentication control unit 542 may detect a face area of the user U from the face image, and include an image of the face area in a face authentication request. Alternatively, the first authentication control unit 542 may extract face feature information from a face area, and include the face feature information in a face authentication request. The first authentication control unit 542 acquires a face authentication result from the authentication device 600, and outputs the face authentication result to the determination unit 543.

The determination unit 543 is one example of the determination unit 13 described above. When the first face authentication succeeds, the determination unit 543 determines the seat position 5122 being associated with the user ID 5121 included in the authentication result. The determination unit 543 outputs a determination result to the decision unit 544.

The decision unit 544 is one example of the decision unit 14 described above. The decision unit 544 decides an exit time period of the user U, based on the determined seat position 5122. For example, the decision unit 544 may decide the exit time period 5132 being associated with the determined seat position 5131. Further, the exit time period 5132 may be decided based on a past or current degree of congestion in the facility. In this way, the decision unit 544 can set a more appropriate exit time period. As described above, the exit time period 5132 may be a riding time of a taxi.

Further, the decision unit 544 may calculate a degree of congestion around the determined seat position 5122, and decide an exit time period, based on a calculation result. In such a case, the information processing device 500 may not store the exit information 513. The degree of congestion may be calculated by analyzing a captured image around the determined seat position 5122.

Further, when the facility X includes a plurality of gates, the decision unit 544 may decide an exit gate recommended to the user U. The decision unit 544 may decide a gate closer to a seat as an exit gate, based on seat arrangement information (not illustrated) that defines an arrangement of seats in the facility. Further, the decision unit 544 may decide an exit gate (not illustrated) being associated with the seat position 5131 in the exit information 513. The decision unit 544 outputs a decided result to the output unit 545.

Figure 7:
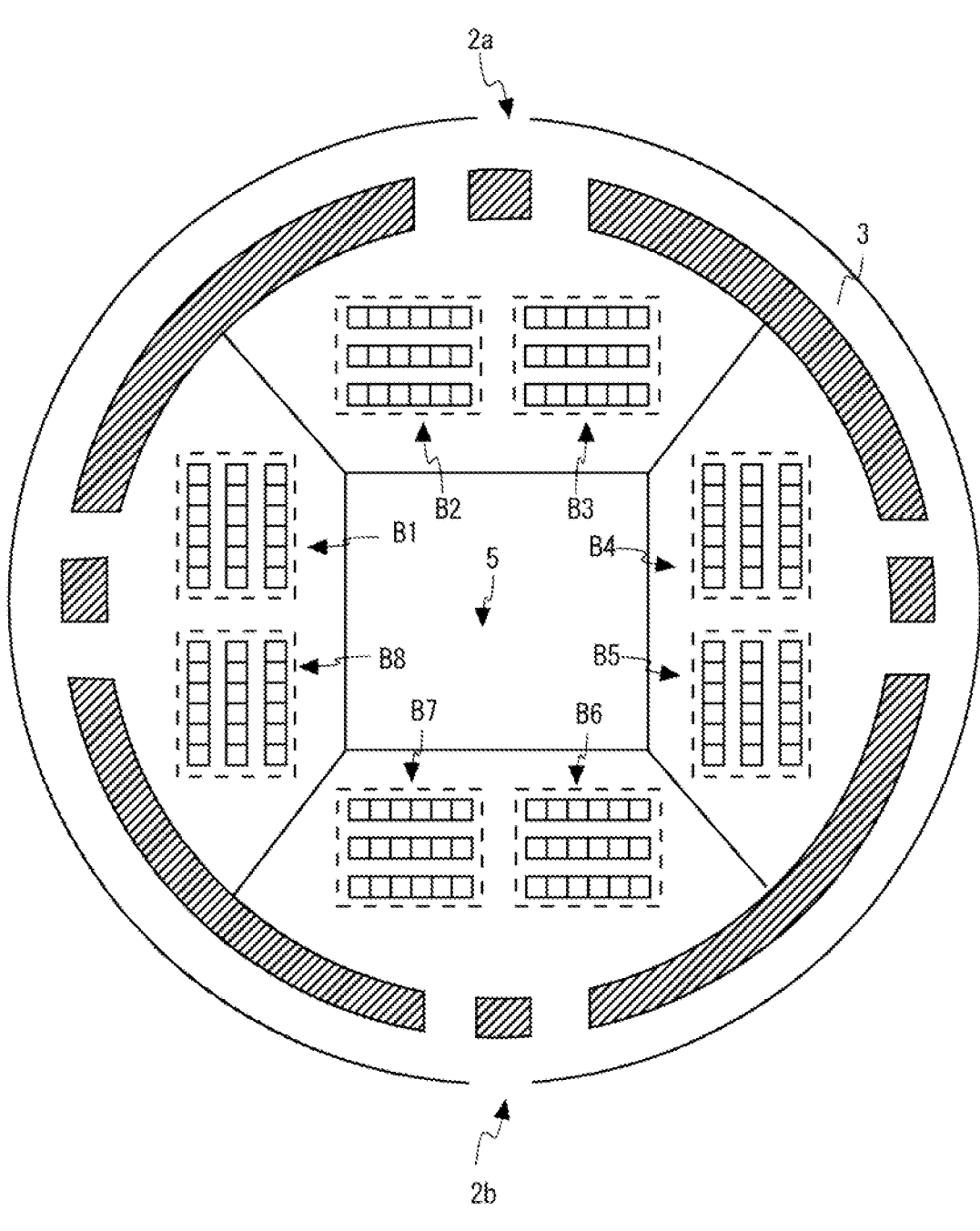
FIG. 7 is a diagram for describing a decision method for an exit gate according to the second example embodiment.

A decision method for an exit gate will be described by using FIG. 7. FIG. 7 is a schematic diagram illustrating a sports arena being one example of the facility X. The facility X includes gates 2a and 2b, a concourse 3, and a sports area 5.

In FIG. 7, blocks B1 to B8 gather a plurality of seats. The seats surround the sports area 5 of the facility X. The first authentication terminal 100 described above may be installed around the seats, or may be installed in the concourse 3. For example, the decision unit 544 decides, as the gate 2a, an exit gate of the user U who sits in a seat included in the blocks B1 to B4, and decides, as the gate 2b, an exit gate of the user U who sits in a seat included in the blocks B5 to B8.

Herein, the decision unit 544 may further decide an exit gate, based on address information about the user U. For example, the decision unit 544 may determine a station used by a user, based on address information, and set a gate having a shorter distance to the station as an exit gate. In this way, the decision unit 544 can guide an appropriate gate for each user. Further, the decision unit 544 may determine a railway map (line) used by the user U in consideration of a current operating situation of a railway, and decide an exit gate. In this way, a time at which a next train comes and a situation where a train stops due to an accident or congestion can be considered. The output unit 545 described below may display a message such as "when ○○ line is used, please exit from ○○ gate", for example.

Further, an exit gate may also be decided according to a degree of congestion being calculated based on a captured image of the facility X. For example, the decision unit 544 may decide an exit gate in such a way that a route from a seat to the gate does not include a point having a high degree of congestion.

Figure 8:
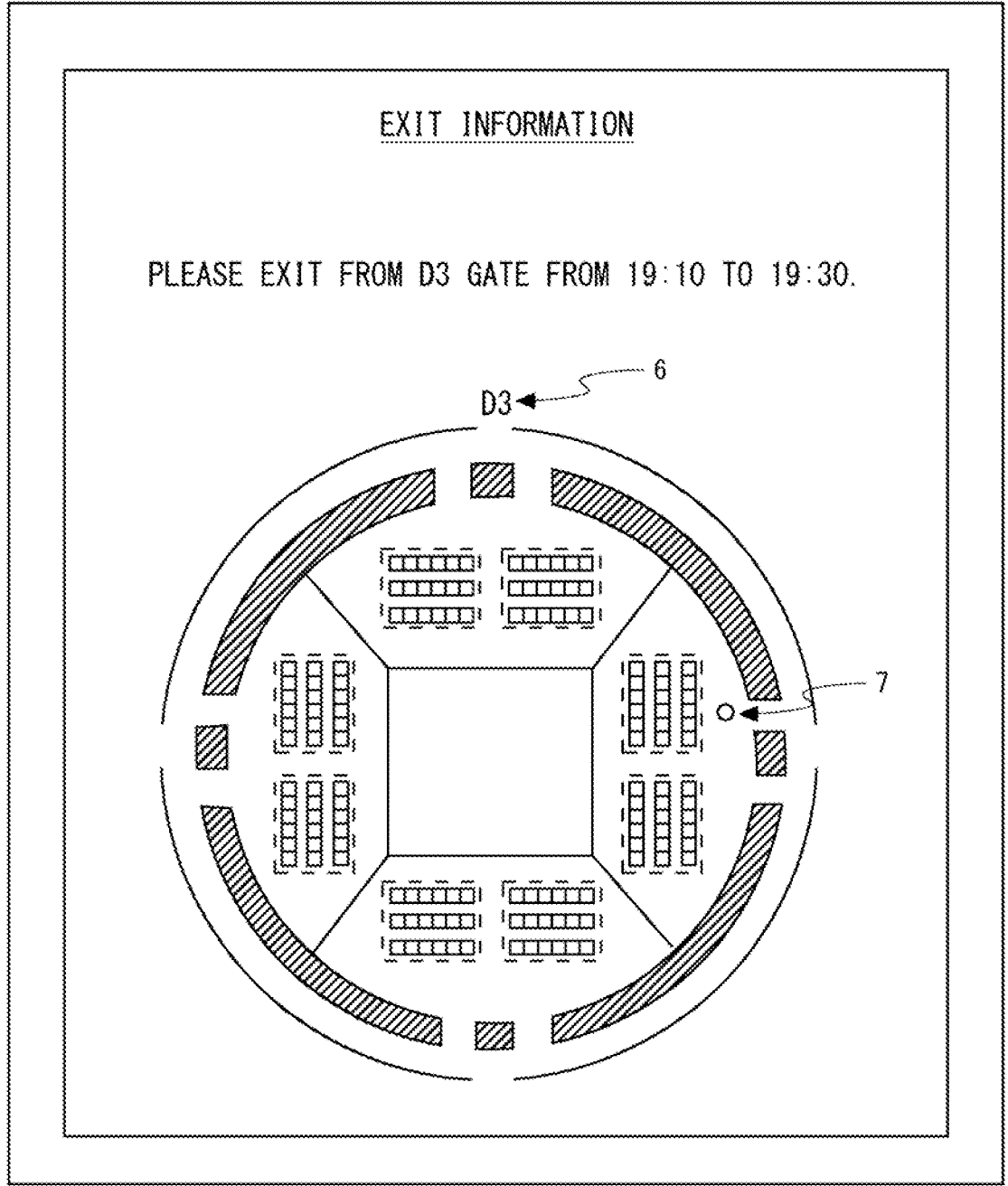
FIG. 8 is an example of a display screen that displays an exit time period and the like according to the second example embodiment.

Returning to FIG. 6, and description continues. The output unit 545 is one example of the output unit 15 described above. The output unit 545 outputs the exit time period being decided by the decision unit 544, and presents the exit time period to the user U. When the decision unit 544 decides an exit gate, the output unit 545 outputs the exit time period and the exit gate. Further, when the exit time period is a riding time of a taxi, the output unit 545 may output a position of a taxi stand. The output unit 545 may display the exit time period on the input/output unit 140 of the first authentication terminal 100, or the terminal 400. FIG. 8 is one example of a user interface (UI) displayed on a display unit of the first authentication terminal 100. FIG. 8 illustrates a time period from 19:10 to 19:30 as an exit time period, and illustrates a D3 gate as an exit gate. The UI may include a map of the facility X, and a position of an exit gate may be displayed on the map. A lower portion of FIG. 8 is map information representing the map of the facility X. The map information includes a display (i.e., an indicator) 6 indicating the exit gate, and a display (i.e., an indicator) 7 indicating a position (current position of the user U) in which the first authentication terminal is installed. Note that, as described above, the display screen illustrated in FIG. 8 may be displayed on the terminal 400 possessed by the user. In such a case, the first face authentication may be performed when the user U logs into the terminal 400.

Returning to FIG. 6, and description continues. The seat information registration unit 546 receives a seat registration request from the first authentication terminal 100, and registers the acquired user ID 5121 and the acquired seat position 5122 in association with each other in the seat information 512. Note that the seat information registration unit 546 may receive a face image and a seat position as a seat registration request, and acquire the user ID 5121 by making a face registration request to the authentication device 600.

The information transmission unit 547 transmits content information to the terminal 400 possessed by the user U until the exit time period. For example, the content information may be a digest video of an event held in the facility X, or may be information about a goods sale of an event held in the facility X. In this way, the user U can view the received content information and wait until the exit time period. Further, the information transmission unit 547 may transmit information that guides the user U to a store in the facility X, based on the exit time period.

Figure 9:
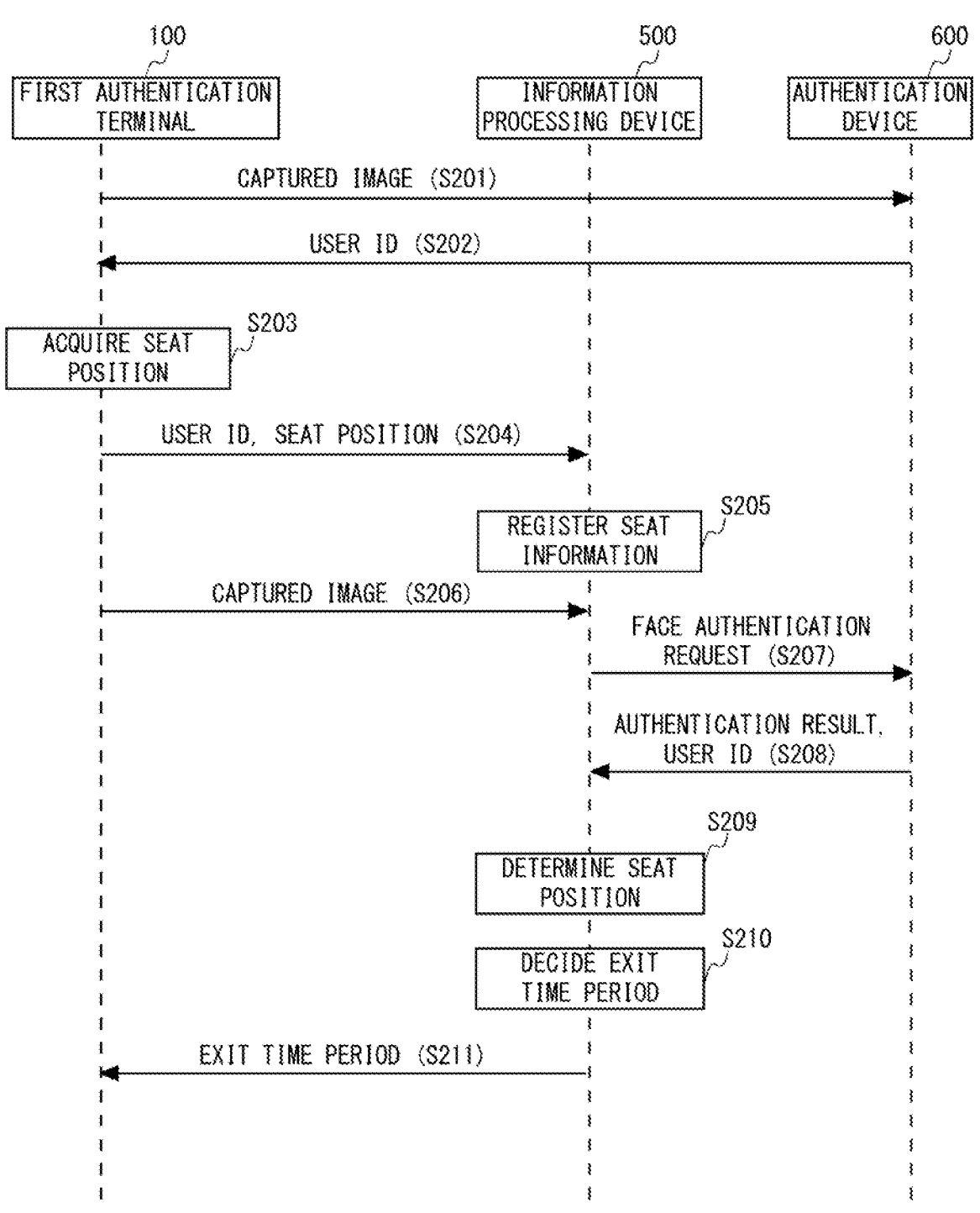
FIG. 9 is a sequence diagram illustrating a flow of an information processing method according to the second example embodiment.

FIG. 9 is a sequence diagram illustrating a flow of the information processing method according to the second example embodiment. First, the first authentication terminal 100 captures a face image of the user U, and transmits a registration request including the captured face image to the authentication device 600 via the network N (S201). Note that, when the face image of the user U is registered in advance in the authentication device 600, the first authentication terminal 100 may make an authentication request. Next, the first authentication terminal 100 receives a user ID from the authentication device 600 (S202). Next, the first authentication terminal 100 acquires a seat position of the user U, based on an input and the like (S203). The first authentication terminal 100 transmits a seat registration request including the acquired seat position and the acquired user ID to the information processing device 500 via the network N (S204). Next, the information processing device 500 registers the acquired seat position and the acquired user ID in the seat information 512 (S205).

Note that the first authentication terminal 100 may transmit a seat registration request including a face image and a seat position to the information processing device 500. In such a case, the information processing device 500 makes a registration request in step S201, and receives a user ID in step S202. Then, the information processing device 500 registers, in the seat information 512, the received user ID and the seat position included in the seat registration request.

At a time of exit, the first authentication terminal 100 captures the face image of the user U, and transmits the face image to the information processing device 500 (S206). Next, the information processing device 500 transmits a face authentication request of the received face image to the authentication device 600 (S207). Next, the authentication device 600 transmits an authentication result including the user ID to the information processing device 500 (step S208). Next, the information processing device 500 determines the seat position of the user U (S209), and decides an exit time period, based on the seat position (S210). Lastly, the information processing device 500 outputs the decided exit time period (S211).

Figure 10:
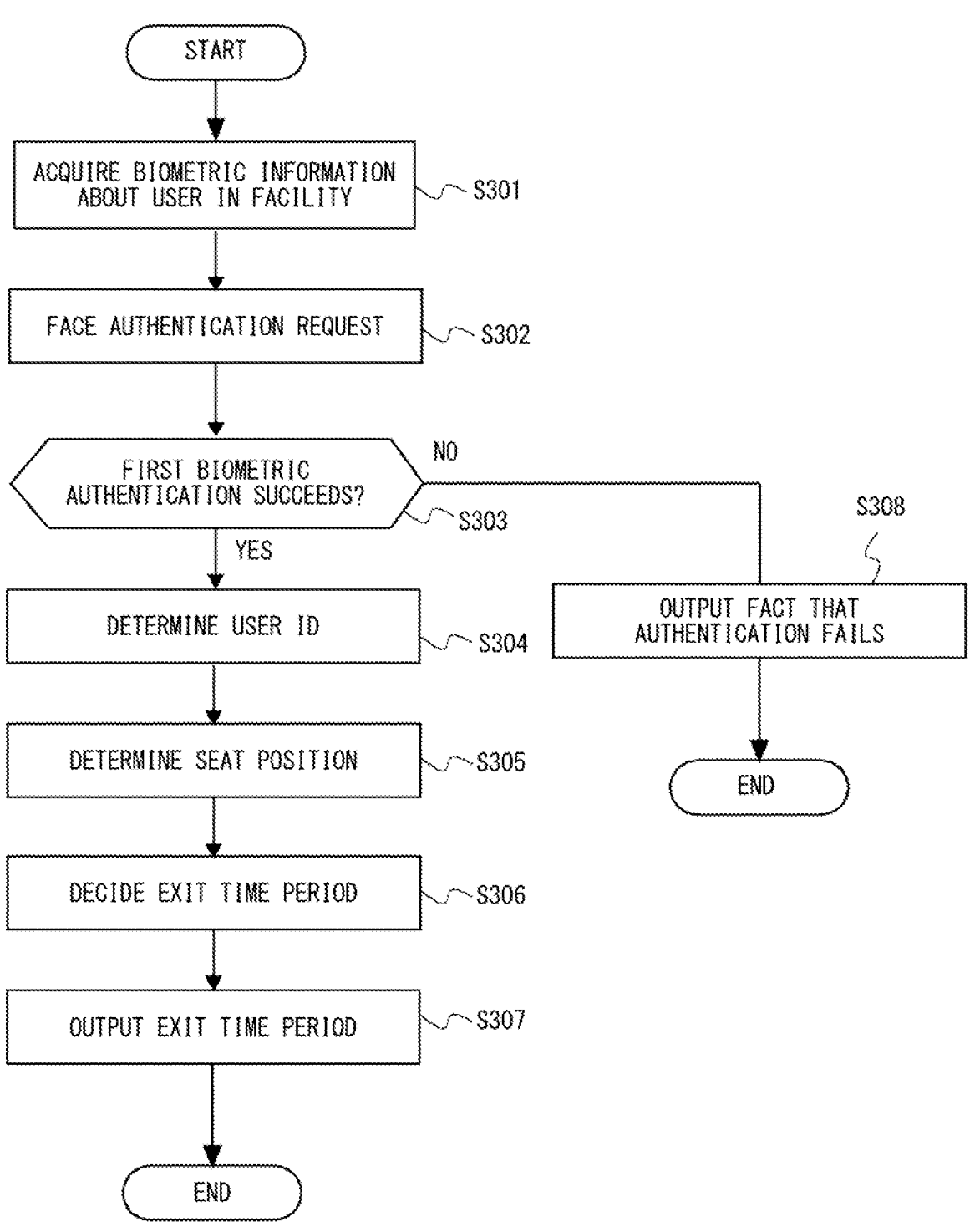
FIG. 10 is a flowchart illustrating a flow of the information processing method according to the second example embodiment.

FIG. 10 is a flowchart illustrating a flow of the information processing method according to the second example embodiment. Note that it is assumed that the seat information 512 is registered in the information processing device 500. First, the first authentication terminal 100 captures a face image of the user U. Then, the first authentication terminal 100 transmits an authentication request including the captured face image to the information processing device 500 via the network N. In response to this, the first biometric information acquisition unit 541 of the information processing device 500 acquires, as biometric information, the face image included in the face authentication request from the first authentication terminal 100 via the network N (S301), and outputs the face image to the first authentication control unit 542.

Then, the first authentication control unit 542 transmits the face authentication request including the acquired face image to the authentication device 600 via the network N (S302). The authentication device 600 receives the face authentication request from the information processing device 500 via the network N, and performs face authentication processing, based on the face image included in the face authentication request. Specifically, the face detection unit 620 detects a face area from the face image. Then, the feature point extraction unit 630 extracts face feature information from the face area. Then, the authentication unit 650 compares the extracted face feature information with the face feature information 612 in the face information DB 610. When the pieces of face feature information coincide with each other, that is, when a degree of coincidence of the face feature information is equal to or more than a predetermined value, the authentication unit 650 determines the user ID 611 of a user whose face feature information coincides, and generates a face authentication result including a fact that face authentication succeeds and the determined user ID. On the other hand, when there is no coinciding face feature information, the authentication unit 650 generates a face authentication result including a fact that the face authentication fails. Subsequently, the authentication unit 650 transmits the generated face authentication result to the information processing device 500 via the network N.

In response to this, the first authentication control unit 542 of the information processing device 500 receives the face authentication result from the authentication device 600 via the network N, and outputs the face authentication result to the determination unit 543. Then, the determination unit 543 judges whether the face authentication succeeds, based on the face authentication result (S303). When it is judged that the face authentication succeeds, the determination unit 543 determines the user ID included in the face authentication result (S304). Then, the determination unit 543 determines the seat position 5122 being associated with the determined user ID 5121 (S305).

Next, the decision unit 544 decides an exit time period of the user U, based on the determined seat position 5122 (S306). The decision unit 544 may further decide an exit gate of the user U, based on the determined seat position 5122. Then, the output unit 545 outputs the decided exit time period and the like to the first authentication terminal 100 and the like (S307).

When it is judged that the face authentication fails in step S303, the information processing device 500 transmits (outputs) a fact that the authentication fails to the first authentication terminal 100 via the network N (S308).

In such a manner, the information processing device according to the second example embodiment can determine a seat of the authenticated user U, and present an exit time period based on a determination result. In this way, the user U can be guided in an appropriate exit time period, and thus a degree of congestion at a time of exit in the facility X can be reduced. Further, a staff member of the facility can guide an exit time period even when the staff member does not remember a face of the user U.

Third Example Embodiment

A third example embodiment is a modification example of the second example embodiment described above. In the third example embodiment, a biometric authentication function is built in an information processing device. An information processing system according to the third example embodiment is similar to the information processing system 1000 described above in which an authentication device 600 is built in an information processing device 500a, and thus illustration and description will be omitted.

Figure 11:
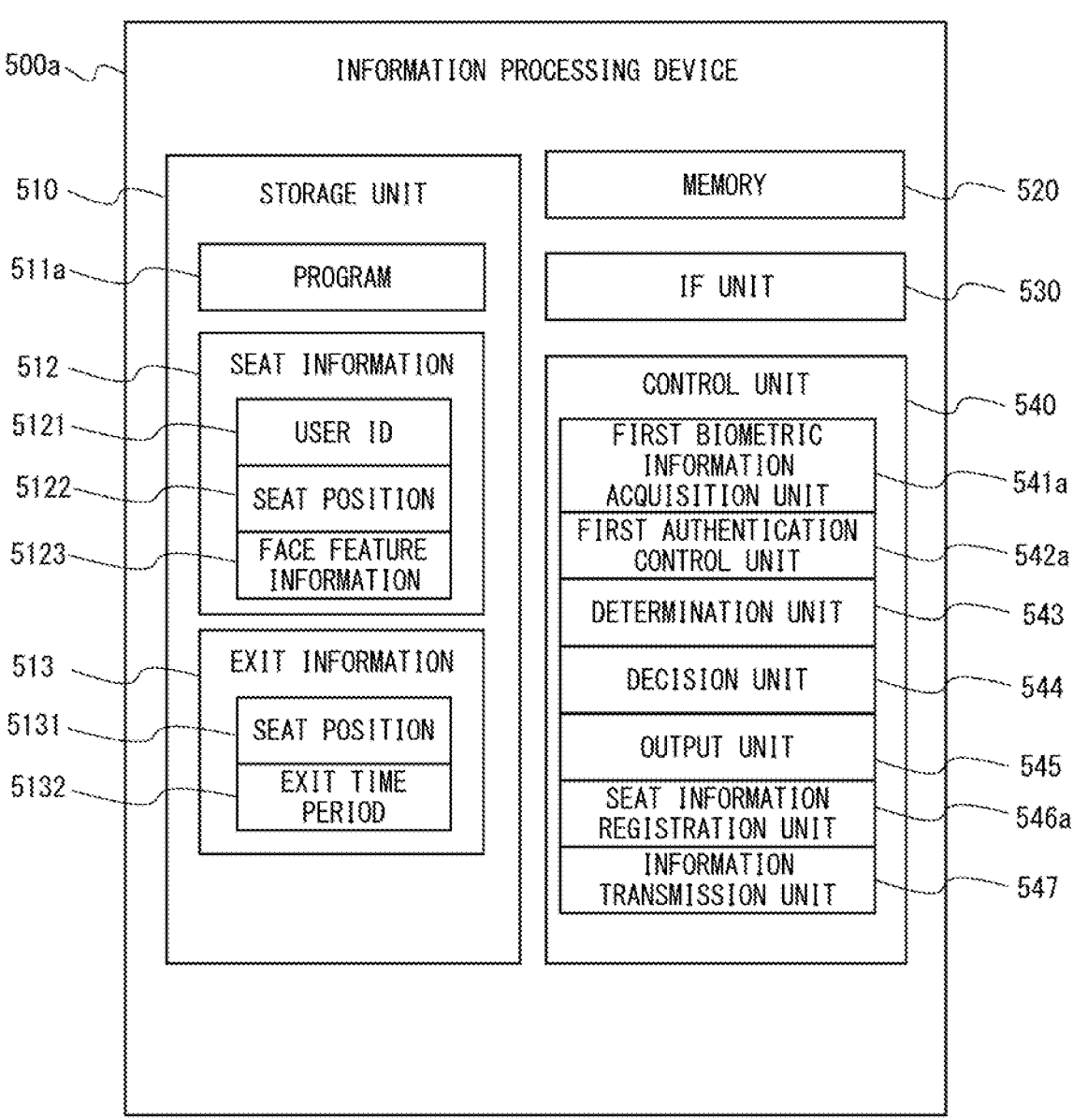
FIG. 11 is a block diagram illustrating a configuration of an information processing device according to a third example embodiment.

FIG. 11 is a block diagram illustrating a configuration of the information processing device 500a according to the third example embodiment. In a storage unit 510 of the information processing device 500a in comparison with the information processing device 500 described above, the program 511 is replaced with a program 511a, and face feature information 5123 is added to seat information 512. Note that the face feature information 5123 is one example of biometric information. Further, in a control unit 540 of the information processing device 500a in comparison with the information processing device 500 described above, the first biometric information acquisition unit 541, the first authentication control unit 542, and the seat information registration unit 546 are replaced with a first biometric information acquisition unit 541a, a first authentication control unit 542a, and a seat information registration unit 546a.

The program 511a is a computer program in which processing of an information processing method according to the third example embodiment is implemented.

The face feature information 5123 is associated with the face feature information 612 of the authentication device 600 described above. The face feature information 5123 is associated with a user ID 5121. In other words, the seat information 512 includes the face information DB 610 described above.

The first biometric information acquisition unit 541a acquires a face image of a visitor U as authentication biometric information from a first authentication terminal 100 via a network N. Further, the first biometric information acquisition unit 541a outputs a face information registration request including the acquired face image to the first authentication control unit 542a.

The first authentication control unit 542a compares face feature information about a plurality of persons and face feature information about a user U, and controls face authentication. In other words, the first authentication control unit 542a acquires a face authentication result by comparing face feature information extracted from a face area of the user included in the acquired face image and the face feature information 5123 stored in the storage unit 510, and performing face authentication.

The seat information registration unit 546a receives a registration image and a seat position from the first authentication terminal 100, and registers the extracted face feature information 5123 and an extracted seat position 5122 in association with each other.

Note that, in the present example embodiment, step S302 in FIG. 10 described above is replaced with face authentication processing in the information processing device 500a by the first authentication control unit 542a. In this way, the third example embodiment can also acquire an effect similar to that in the second example embodiment described above.

Fourth Example Embodiment

Figure 12:
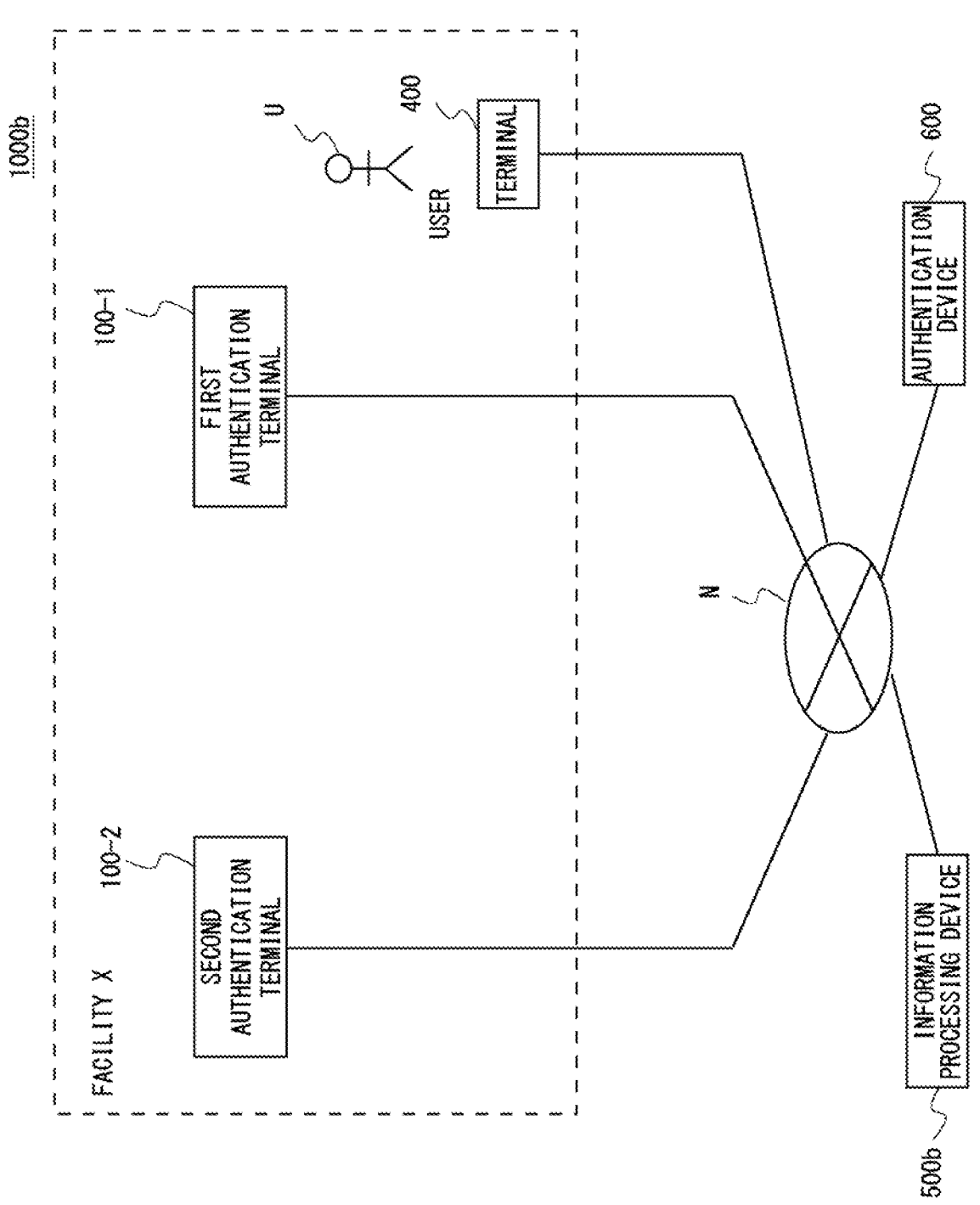
FIG. 12 is a block diagram illustrating a configuration of an information processing system according to a fourth example embodiment.

A fourth example embodiment is a modification example of the second example embodiment described above. In the fourth example embodiment, whether a user exits in a decided exit time period is judged. FIG. 12 is a block diagram illustrating a configuration of an information processing system 1000*b* according to the fourth example embodiment. In the information processing system 1000*b* in comparison with the information processing system 1000 described above, the information processing device 500 is replaced with an information processing device 500*b*, and a second authentication terminal 100-2 is added. Note that a first authentication terminal 100-1 is associated with the first authentication terminal 100.

The second authentication terminal 100-2 is installed at a gate included in a facility X. A configuration of the second authentication terminal 100-2 is similar to that of the first authentication terminal 100 illustrated in FIG. 5, and thus description and illustration will be omitted.

When the facility X includes a plurality of gates and the second authentication terminal 100-2 is installed at each gate, an authentication control unit 153 of the second authentication terminal 100-2 may include, in a face authentication request, a gate ID of an installed gate and an image-capturing time of an authentication image (face image). Note that identification information (terminal ID) about the second authentication terminal 100-2 may be used instead of the gate ID.

Figure 13:
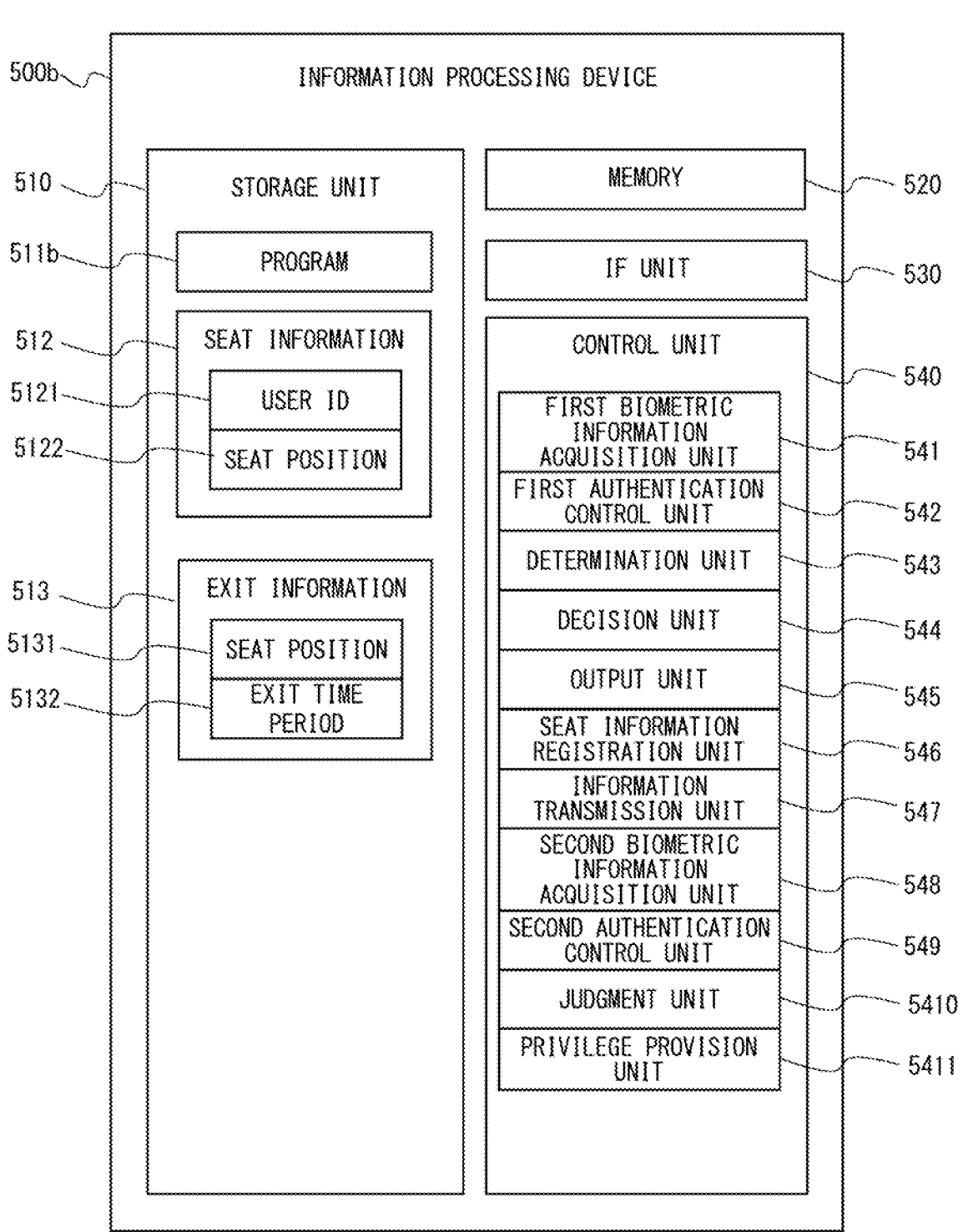
FIG. 13 is a block diagram illustrating a configuration of an information processing device according to the fourth example embodiment.

FIG. 13 is a block diagram illustrating a configuration of the information processing device 500*b* according to the fourth example embodiment. In a storage unit 510 of the information processing device 500*b* in comparison with the information processing device 500 described above, the program 511 is replaced with a program 511*b*. Further, in a control unit 540 of the information processing device 500*b* in comparison with the information processing device 500 described above, a second biometric information acquisition unit 548, a second authentication control unit 549, a judgment unit 5410, and a privilege provision unit 5411.

The program 511*b* is a computer program in which processing of an information processing method according to the fourth example embodiment is implemented.

The second biometric information acquisition unit 548 acquires, as biometric information, a face image included in a face authentication request from the second authentication terminal 100-2, and outputs the face image to the second authentication control unit 549. The second biometric information acquisition unit 548 may further acquire information about a gate at which the second authentication terminal 100-2 is installed.

The second authentication control unit 549 controls face authentication performed on a face area of the user U included in the face image being received from the second biometric information acquisition unit 548. In other words, the second authentication control unit 549 causes an authentication device 600 to perform face authentication on the face image. The second authentication control unit 549 acquires a face authentication result from the authentication device 600, and outputs the face authentication result to the judgment unit 5410. The face authentication result may include a user ID, a gate ID, and an image-capturing time. The face authentication by the second authentication control unit 549 is also referred to as second face authentication.

The judgment unit 5410 acquires an exit time period of the user U when the second face authentication succeeds, and judges whether a current time is in the exit time period. The judgment unit 5410 may determine a seat position 5122 being associated with a user ID 5121 included in the authentication result, decide an exit time period 5132 being associated with the determined seat, and judge whether a current time is in the exit time period.

Further, the exit time period 5132 decided by a decision unit 544 may be registered in association with the user ID 5121 in the storage unit 510. In other words, the information processing device 500*b* may include an exit time period registration unit (not illustrated) that registers the exit time period decided by the decision unit 544 and a user ID or face feature information in association with each other in the storage unit 510. In such a case, the storage unit 510 may not store exit information 513. A current time may be an image-capturing time or an authentication time included in the authentication result. The judgment unit 5410 outputs a judgment result to the privilege provision unit 5411.

Further, when an exit gate is decided by the decision unit 544, the judgment unit 5410 further judges whether a gate ID acquired from the second authentication terminal 100-2 is a gate ID of the decided exit gate. It is assumed that the second authentication terminal 100-2 transmits a face authentication request including the gate ID to the information processing device 500*b*. The decision unit 544 judges whether the ID of the exit gate being associated with the user ID 5121 included in the authentication result coincides with the gate ID included in the face authentication request. Note that it is assumed that the exit gate decided by the decision unit 544 is registered in association with the user ID 5121 in the storage unit 510.

Figure 14:
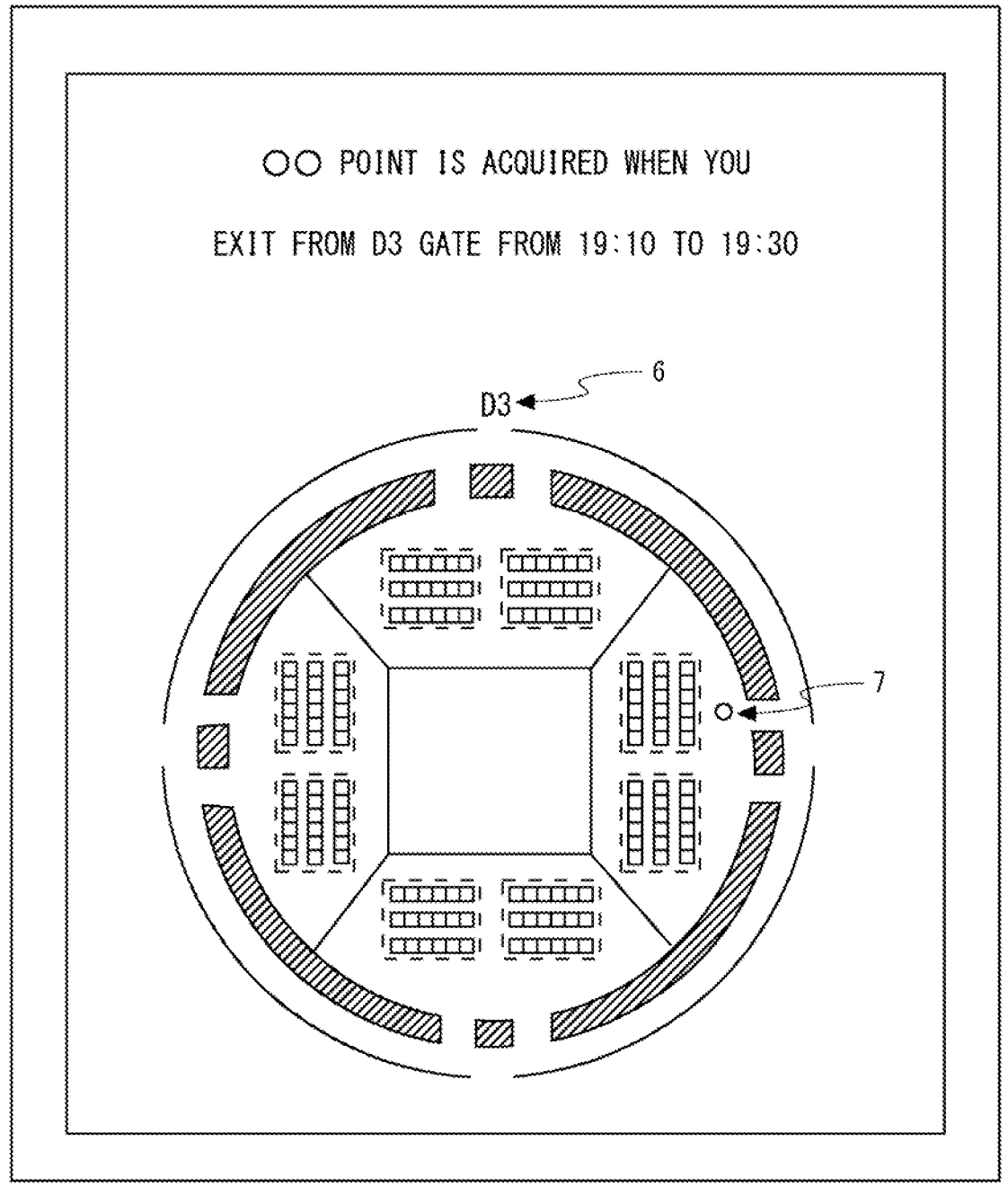
FIG. 14 is an example of a display screen illustrating information about provision of a privilege according to the fourth example embodiment.
Figure 15:
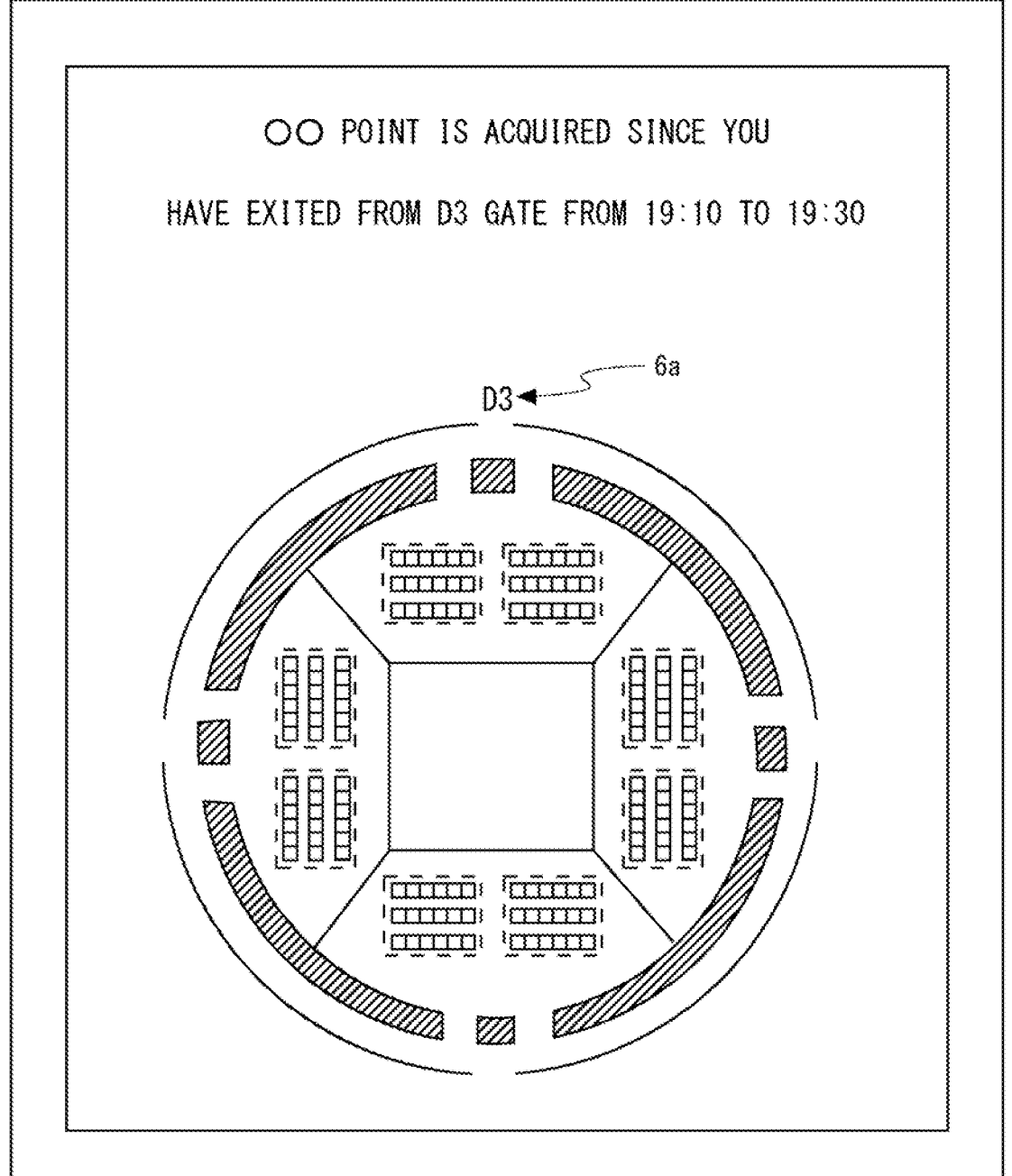
FIG. 15 is an example of a display screen illustrating that a privilege is provided according to the fourth example embodiment.

The privilege provision unit 5411 provides a privilege to the user U when the judgment result by the judgment unit 5410 is true. For example, the privilege provision unit 5411 may transmit coupon information to a terminal 400 possessed by the user U. The privilege provision unit 5411 may register information for providing a privilege in association with a user ID in the storage unit 510. For example, the privilege may be a point, may be a discount ticket, and may be a ticket to be used next time. The ticket is, for example, a ticket of an event held in the facility X. The discount ticket may be a discount ticket of the ticket. The point can be stored, and exchanged with a discount ticket and a ticket when a predetermined point is reached. Note that an output unit 545 may output information about provision of a privilege when the output unit 545 outputs (displays) an exit time period and the like on a display unit of the first authentication terminal 100-1 or a display unit of the terminal 400. Further, the output unit 545 may output (display) information about an acquired privilege on a display unit of the second authentication terminal 100-2 or the display unit of the terminal 400. FIGS. 14 and 15 are diagrams illustrating a UI displayed by the information processing device 500*b*. The UI is, for example, a display screen of the first authentication terminal 100-1 and the second authentication terminal 100-2 being signage. FIG. 14 illustrates that a point can be acquired when exit is made from a D3 gate from 19:10 to 19:30. A lower portion of FIG. 14 is map information representing a map of the facility X. The map information includes a display (i.e., an indicator) 6 indicating the exit gate, and a display (i.e., an indicator) 7 indicating a position (current position of the user U) in which the first authentication terminal is installed. Further, FIG. 15 illustrates that a point is provided to a user who has exited from the D3 gate from 19:10 to 19:30. A lower portion of FIG. 15 is map information representing the map of the facility X. The map information includes a display (i.e., an indicator) 6a indicating a gate through which the user U has actually passed. Note that, as described above, the display screens illustrated in FIGS. 14 and 15 may be displayed on the terminal 400 possessed by the user. In such a case, first face authentication and the second face authentication may be performed when the user U logs into the terminal 400.

Note that, instead of the privilege provision unit 5411, an entry control unit (not illustrated) that controls opening and closing of a gate may be included in the information processing device 500a. The entry control unit opens a gate when a judgment result is true, and closes the gate when a judgment result is false. In this way, the user U can exit in a specified exit time period, and thus a degree of congestion at a time of exit in the facility X can be reduced. The information processing device 500b may include any one of the privilege provision unit 5411 and the entry control unit (not illustrated).

Figure 16:
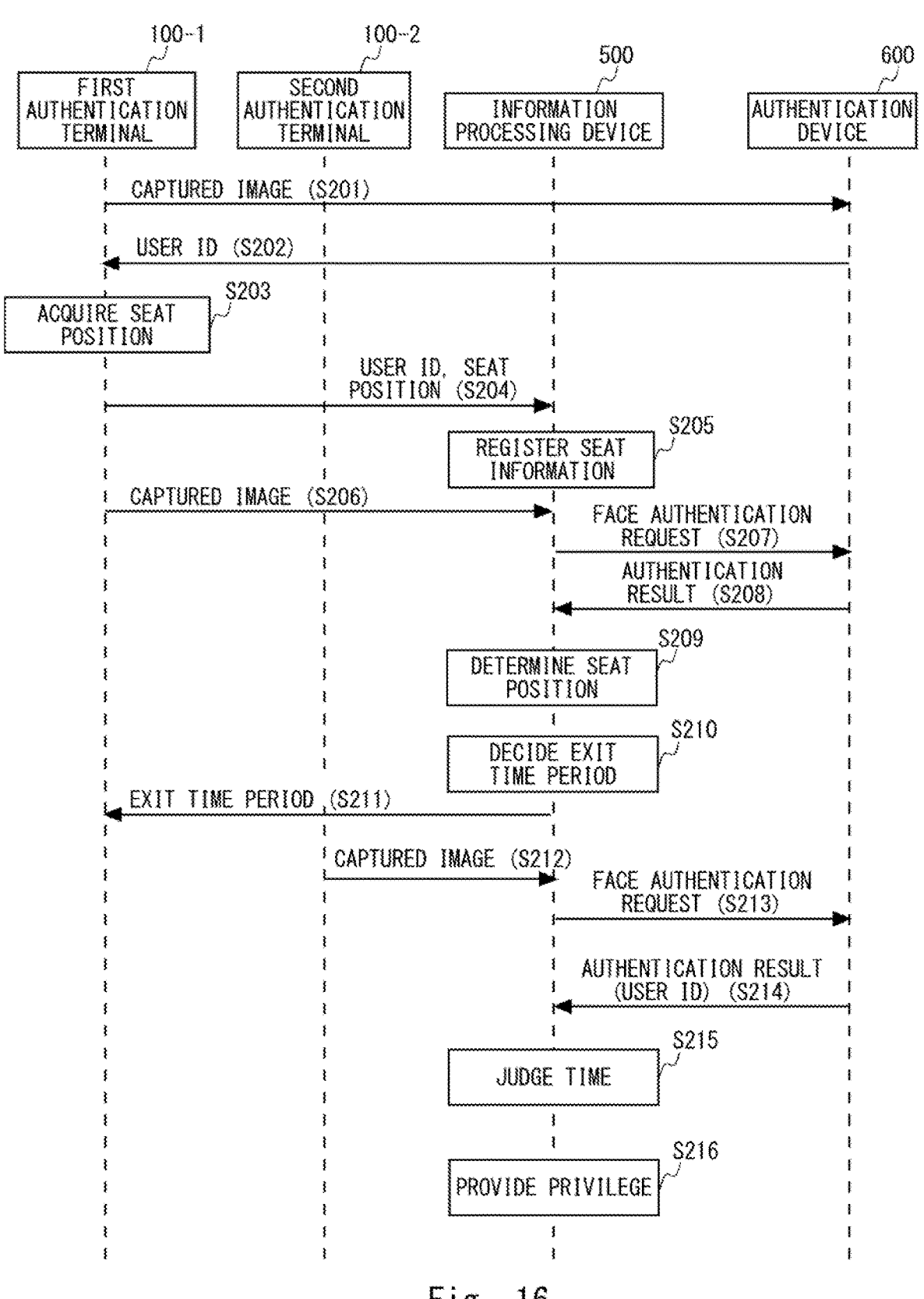
FIG. 16 is a sequence diagram illustrating a flow of an information processing method according to the fourth example embodiment.

FIG. 16 is a sequence diagram illustrating a flow of information processing according to the fourth example embodiment. Processing in steps S201 to S211 is similar to that in FIG. 9, and thus description will be omitted. Note that an exit time period and the like decided in step S210 may be registered in association with a user ID in the information processing device 500.

In step S212, the second authentication terminal 100-2 installed at a gate of the facility X captures a face image of the user U, and transmits the face image to the information processing device 500b (S212). Next, the information processing device 500b transmits a face authentication request including the received face image to the authentication device 600 (S213). Next, the information processing device 500b receives an authentication result including a user ID from the authentication device 600 (S214). Next, the information processing device 500b judges whether a current time is in an exit time period of the user U (S215). Herein, the information processing device 500b may judge whether the current time is in the exit time period and a gate to be exited is an exit gate. Lastly, the information processing device 500b provides a privilege to the user U according to a judgment result (S216). Note that the information processing device 500b may control opening and closing of a gate according to the judgment result.

Figure 17:
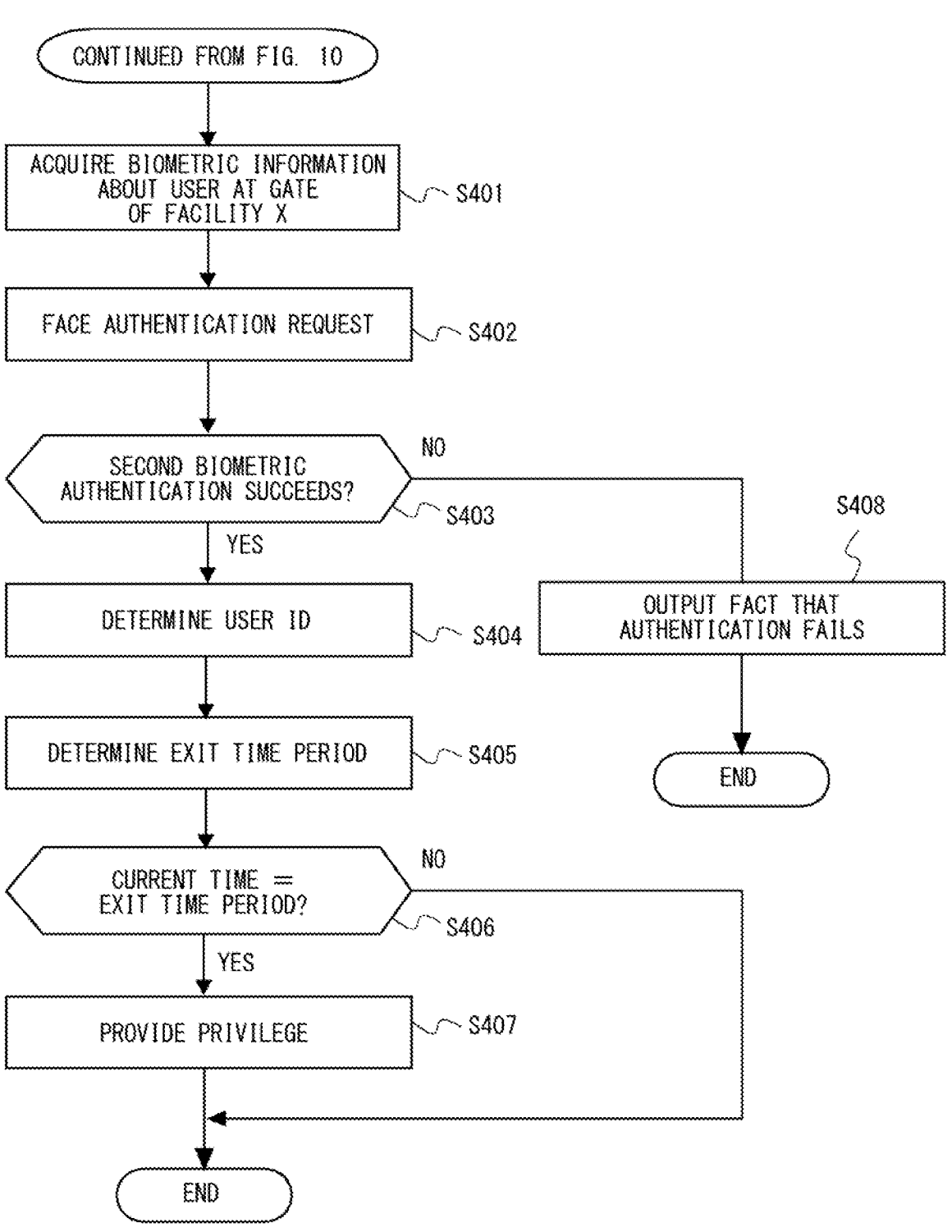
FIG. 17 is a flowchart illustrating a flow of the information processing method according to the fourth example embodiment.

Next, a flow of the information processing method according to the fourth example embodiment will be described by using FIG. 17. FIG. 17 is the processing continued from the processing in FIG. 10.

The second authentication terminal 100-2 captures a face image of the user U at a gate of the facility X. Then, the second authentication terminal 100-2 transmits an authentication request including the captured face image to the information processing device 500b via the network N. The authentication request may include a gate ID. In response to this, the second biometric information acquisition unit 548 of the information processing device 500b acquires, as biometric information, the face image included in the face authentication request from the second authentication terminal 100-2 via the network N (S401), and outputs the face image to the second authentication control unit 549. When the second biometric information acquisition unit 548 acquires the gate ID included in the face authentication request, the second biometric information acquisition unit 548 may output the gate ID to the judgment unit 5410.

Then, the second authentication control unit 549 transmits the face authentication request including the acquired face image to the authentication device 600 via the network N (S402). The authentication device 600 receives the face authentication request from the information processing device 500b via the network N, and performs face authentication processing, based on the face image included in the face authentication request.

In response to this, the second authentication control unit 549 of the information processing device 500b receives a face authentication result from the authentication device 600 via the network N, and outputs the face authentication result to the judgment unit 5410. Then, the judgment unit 5410 judges whether the face authentication succeeds, based on the face authentication result (S403). When it is judged that the face authentication succeeds, the judgment unit 5410 determines the user ID included in the face authentication result (S404). Then, the judgment unit 5410 determines an exit time period being associated with the determined user ID 5121 (S405). Herein, the judgment unit 5410 may determine the exit time period and an exit gate being associated with the user ID 5121. The judgment unit 5410 may determine an exit time period being associated with a seat position of the user U. Further, the decided exit time period may be registered in association with the user ID in the storage unit.

Next, the judgment unit 5410 judges whether a current time is in the determined exit time period (S406). Herein, the judgment unit 5410 may judge whether the current time is in the exit time period and the gate ID included in the face authentication request is the determined exit gate. The judgment unit 5410 outputs a judgment result to the privilege provision unit 5411.

When it is judged that the current time is in the exit time period in step S406, the privilege provision unit 5411 provides a privilege to the user U determined in step S404 (step S407). The privilege provision unit 5411 may manage the user ID determined in step S404 and privilege information in association with each other, or transmit coupon information to an information terminal being associated with the user ID. The information processing device 500b may control opening and closing of a gate according to a judgment result instead of privilege provision. Note that, in a case of NO in step S406, the processing ends.

Note that, when it is judged that the face authentication fails in step S403, the information processing device 500b transmits (outputs) a fact that the authentication fails to the second authentication terminal 100-2 via the network N (step S408).

In such a manner, the information processing device according to the fourth example embodiment presents an exit time period and the like to the user U, then performs the second biometric authentication at a gate, and judges whether a current time is in the exit time period of the user U. In this way, a privilege can be provided to the user who makes exit in the exit time period, and motivation of the user to exit in the exit time period can be strengthened.

Fifth Example Embodiment

Figure 18:
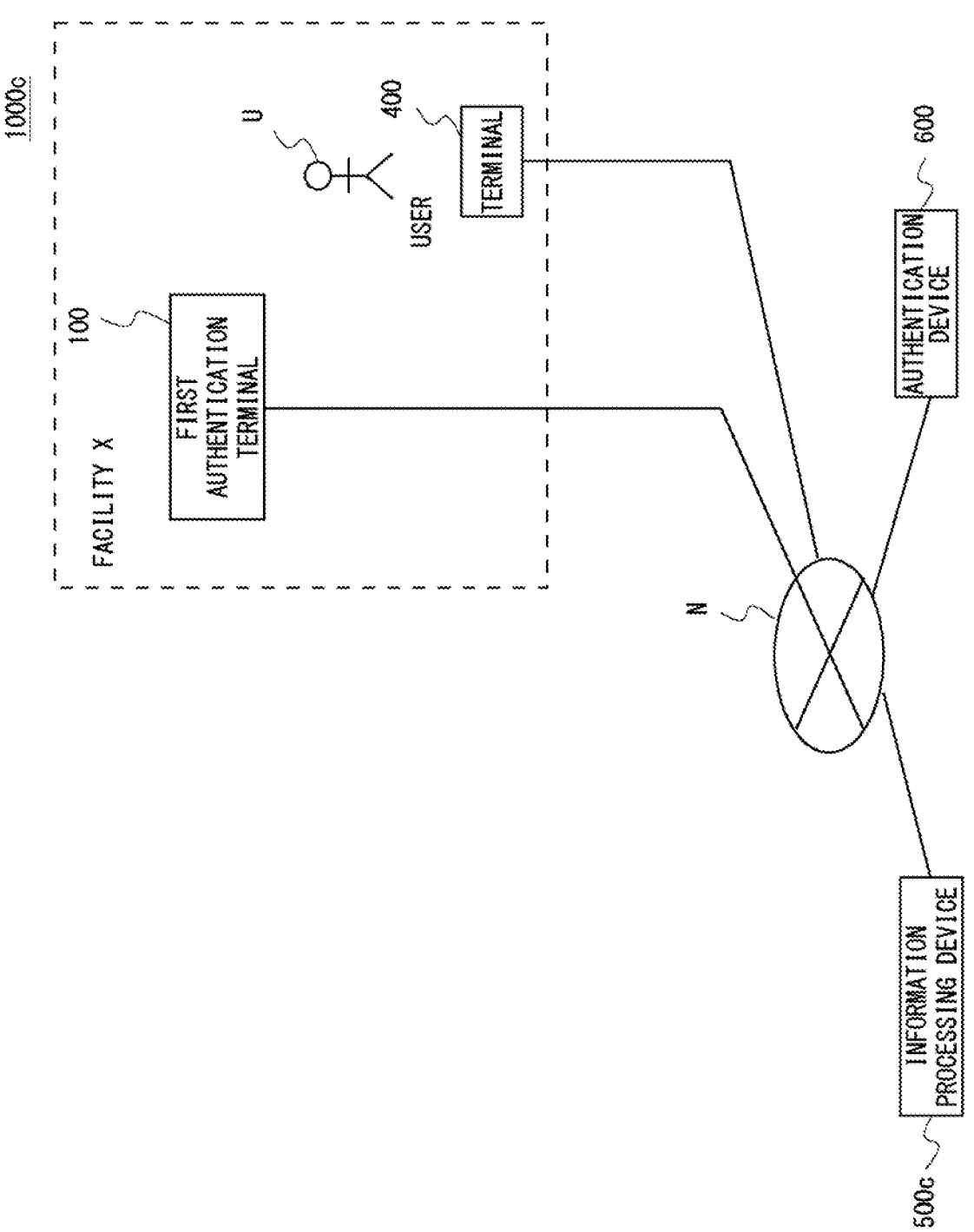
FIG. 18 is a block diagram illustrating a configuration of an information processing system according to a fifth example embodiment.

A fifth example embodiment is a modification example of the second example embodiment described above. The second example embodiment gives advice about an exit time period to a user, but the fifth example embodiment gives advice about behavior at a time of entry to a user U. FIG. 18 is a block diagram illustrating a configuration of an information processing system 1000c according to the fifth example embodiment. In the information processing system 1000c in comparison with the information processing system 1000 described above, the information processing device 500 is replaced with an information processing device 500c. A first authentication terminal 100 captures a user who enters a facility X. The first authentication terminal 100 is installed at a gate of the facility X, for example.

Figure 19:
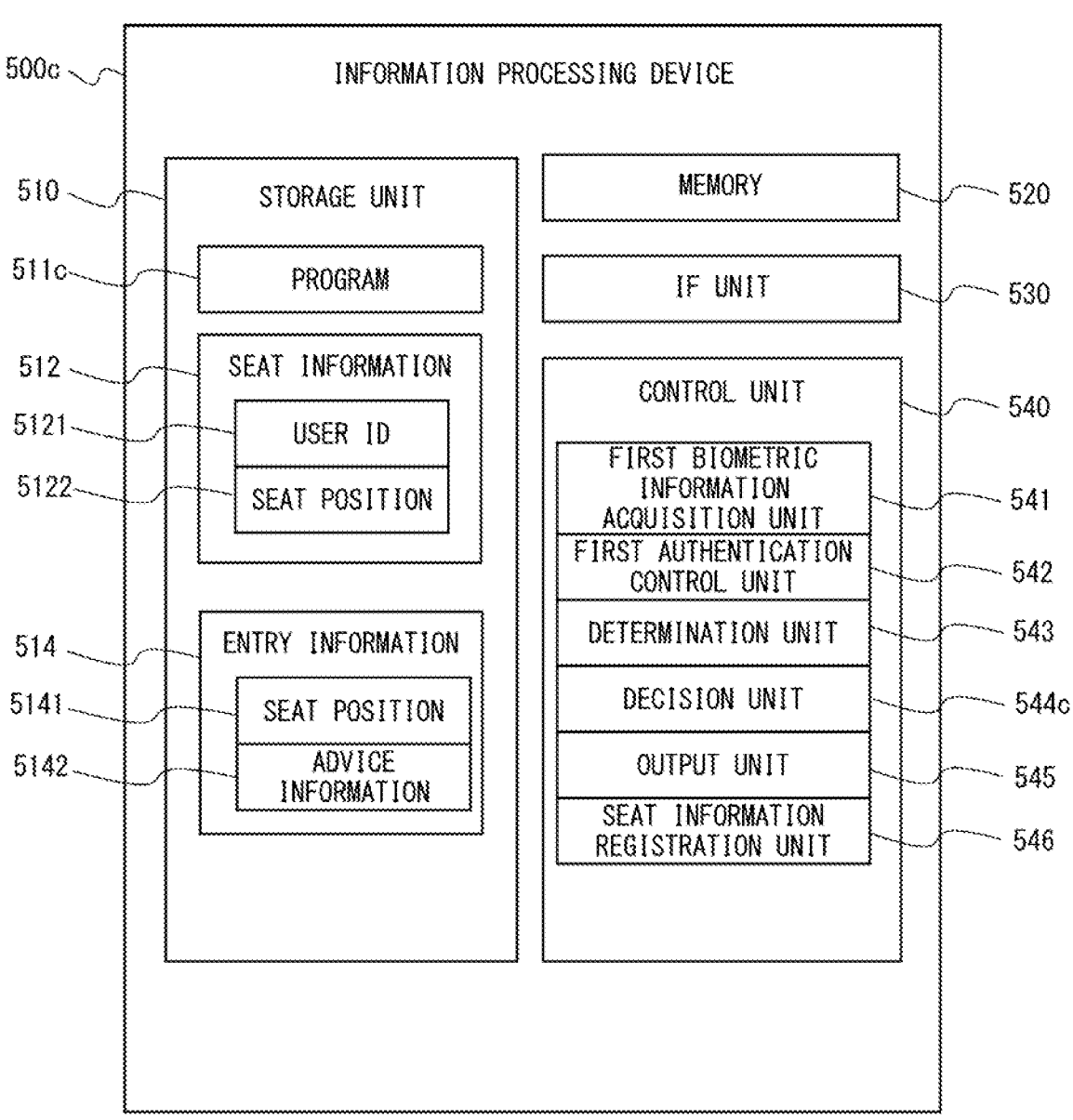
FIG. 19 is a block diagram illustrating a configuration of an information processing device according to the fifth example embodiment.

FIG. 19 is a block diagram illustrating a configuration of the information processing device 500c according to the fourth example embodiment. In a storage unit 510 of the information processing device 500c in comparison with the information processing device 500 described above, the program 511 is replaced with a program 511c, and the exit information 513 is replaced with entry information 514. Further, in a control unit 540 of the information processing device 500c in comparison with the information processing device 500 described above, the decision unit 544 is replaced with a decision unit 544c. Note that it is assumed in the fifth example embodiment that seat information 512 is registered in advance by using a terminal 400 and the like before entry of the user U.

The program 511c is a computer program in which processing of an information processing method according to the fifth example embodiment is implemented.

In the entry information 514, a seat position 5141 and advice information 5142 are associated with each other. The seat position 5141 is associated with a seat position 5122. In the entry information 514, for example, the seat position 5141 of a seat located away from a toilet and the advice information 5142 that gives advice to go to the toilet before taking a seat may be associated with each other. Further, in the entry information 514, the seat position 5141 of a seat located away from a sports area and the advice information 5142 that gives advice to buy binoculars before entry may be associated with each other.

Further, the seat information 512 in the storage unit 510 may include an attendance history to the facility X of the user U. In this way, the attendance history of the user U is further associated with face feature information.

The decision unit 544c receives the seat position 5122 being determined by a determination unit 543, and decides the advice information 5142 being associated with the associated seat position 5141. The decision unit 544c outputs the decided advice information 5142 to an output unit 545. The output unit 545 outputs the decided advice information 5142 to the first authentication terminal 100 and the like.

Further, the output unit 545 may acquire an attendance history of the user U being determined by the determination unit 543, and further output a message based on the attendance history. The message based on the attendance history is, for example, a message such as "it is ~-th watching in this season", or a message such as "we will win today since we lost a game watched last time".

Further, the output unit 545 may further output information that needs to be kept in mind at a time of entry to the facility X. The information that needs to be kept in mind is, for example, information indicating that reentry is not permitted once a user enters the facility X, or that an article sold outside the facility cannot be purchased in the facility X.

A flow of the information processing method according to the fifth example embodiment is similar to that in FIG. 10. However, in step S306, the decision unit 544c of the information processing device 500c decides advice information at a time of entry. In step S306, the decided advice information is output.

In such a manner, the information processing device according to the fifth example embodiment determines a seat position of a user, and decides advice to the user, based on the determined seat position. In this way, appropriate advice according to a seat position can be present to a user who makes entry.

Note that the example embodiments described above have been described above as a configuration of hardware, which is not limited thereto. The present disclosure can also achieve any processing by causing a CPU to execute a computer program.

In the example described above, the program may be stored by using various types of non-transitory computer-readable mediums, and may be supplied to a computer. The non-transitory computer-readable medium includes various types of tangible storage mediums. Examples of the non-transitory computer-readable medium include a magnetic recording medium (for example, a flexible disc, a magnetic tape, and a hard disc drive), a magneto-optical recording medium (for example, a magneto-optical disc), a CD-read only memory (CD-ROM), a CD-R, a CD-R/W, a digital versatile disc (DVD), and a semiconductor memory (for example, a mask ROM, a programmable ROM (PROM), an erasable PROM (EPROM), a flash ROM, and a random access memory (RAM)). Further, the program may be supplied to the computer by various types of transitory computer-readable mediums. Examples of the transitory computer-readable medium include an electrical signal, an optical signal, and an electromagnetic wave. The transitory computer-readable medium may supply the program to the computer via a wired communication path such as an electric wire and an optical fiber or a wireless communication path.

Note that the present disclosure is not limited to the example embodiments described above, and may be appropriately modified without departing from the scope of the present disclosure. Further, the present disclosure may be implemented by appropriately combining the example embodiments.

The invention of the present application is described above with reference to the example embodiments (examples), but the invention of the present application is not limited to the example embodiments (examples) described above. Various modifications that can be understood by those skilled in the art can be made to the configuration and the details of the invention of the present application within the scope of the invention of the present application.

A part or the whole of the example embodiments described above can be described as, but not limited to, the following supplementary notes.

(Supplementary Note 1)

An information processing device including:

a first biometric information acquisition means for acquiring biometric information about a user in a facility in which a plurality of seats are disposed;

a first authentication control means for controlling first biometric authentication of the acquired biometric information against registered biometric information about a plurality of persons;

a determination means for determining, based on seat information in which a seat position of each person is associated with the registered biometric information, the seat position of the user when the first biometric authentication succeeds;

a decision means for deciding assistance information for assisting in behavior at a time of entry or at a time of exit of the user, based on the seat position; and an output means for outputting the assistance information.

(Supplementary Note 2)

The information processing device according to Supplementary Note 1, wherein the decision means decides, as the assistance information, an exit time period recommended to the user, based on the seat position, when the first biometric authentication succeeds, and the information processing device further includes:

a second biometric information acquisition means for acquiring biometric information about the user at a gate of the facility;

a second authentication control means for controlling second biometric authentication of the biometric information being acquired at the gate against the registered biometric information about the plurality of persons; and a judgment means for acquiring the exit time period of the user when the second biometric authentication succeeds, and judging whether a current time is in the exit time period.

(Supplementary Note 3)

The information processing device according to Supplementary Note 2, wherein the facility includes a plurality of gates, the decision means decides, as the assistance information, an exit gate and the exit time period being recommended to the user, based on the seat position, when the first biometric authentication succeeds, the second biometric information acquisition means acquires the biometric information at a time of exit of the user and information about a gate from which the user exits, and the judgment means acquires the exit gate and the exit time period of the user when the second biometric authentication succeeds, and judges whether a current time is in the exit time period and the gate to be exited from is the exit gate.

(Supplementary Note 4)

The information processing device according to Supplementary Note 3, wherein the seat information includes address information about each person, the address information is further associated with the registered biometric information, the determination means determines the seat position and the address information about the user, based on the seat information, when the first biometric authentication succeeds, and the decision means further decides the exit gate recommended to the user, based on the address information, when the first biometric authentication succeeds.

(Supplementary Note 5)

The information processing device according to any one of Supplementary Notes 2 to 4, further including a privilege provision means for providing a privilege to the user when a judgment result by the judgment means is true.

(Supplementary Note 6)

The information processing device according to any one of Supplementary Notes 2 to 5, wherein the decision means further decides the exit time period, based on at least any of a past degree of congestion in the facility and a current degree of congestion.

(Supplementary Note 7)

The information processing device according to any one of Supplementary Notes 2 to 6, further including a transmission means for transmitting content information to an information terminal possessed by the user until the exit time period.

(Supplementary Note 8)

The information processing device according to Supplementary Note 1, wherein the seat information includes an attendance history to the facility of each user, the attendance history is further associated with the registered biometric information, and the output means determines the attendance history of the user, and further outputs a message based on a determination result.

(Supplementary Note 9)

An information processing system including:

a first authentication terminal installed in a facility in which a plurality of seats are disposed; and an information processing device, wherein the information processing device acquires biometric information about a user from the first authentication terminal, controls first biometric authentication of the acquired biometric information against registered biometric information about a plurality of persons, determines, based on seat information in which a seat position of each person is associated with the registered biometric information, a seat position of the user when the first biometric authentication succeeds, decides assistance information for assisting in behavior at a time of entry or at a time of exit of the user, based on the seat position, and outputs the assistance information.

(Supplementary Note 10)

The information processing system according to Supplementary Note 9, further including a second authentication terminal installed at a gate of the facility, wherein the information processing device decides, as the assistance information, an exit time period recommended to the user, based on the seat position, when the first biometric authentication succeeds, acquires biometric information about the user from the second authentication terminal, controls second biometric authentication of the biometric information being acquired from the second authentication terminal against the registered biometric information about the plurality of persons, and acquires the exit time period of the user when the second biometric authentication succeeds, and judges whether a current time is in the exit time period of the user.

(Supplementary Note 11)

An information processing method including, by a computer:

acquiring biometric information about a user in a facility in which a plurality of seats are disposed;

controlling first biometric authentication of the acquired biometric information against registered biometric information about a plurality of persons;

determining, based on seat information in which a seat position of each person is associated with the registered biometric information, a seat position of the user when the first biometric authentication succeeds;

deciding assistance information for assisting in behavior
at a time of entry or at a time of exit of the user, based
on the seat position; and
outputting the assistance information.
(Supplementary Note 12)
A non-transitory computer-readable medium storing an
information processing program causing a computer to
execute:
processing of acquiring biometric information about a
user in a facility in which a plurality of seats are
disposed;
processing of controlling first biometric authentication of
the acquired biometric information against registered
biometric information about a plurality of persons;
processing of determining, based on seat information in
which a seat position of each person is associated with
the registered biometric information, a seat position of
the user when the first biometric authentication suc-
ceeds;
processing of deciding assistance information for assist-
ing in behavior at a time of entry or at a time of exit of
the user, based on the seat position; and
processing of outputting the assistance information.

REFERENCE SIGNS LIST

1 INFORMATION PROCESSING DEVICE
11 FIRST BIOMETRIC INFORMATION ACQUISI-
TION UNIT
12 FIRST AUTHENTICATION CONTROL UNIT
13 DETERMINATION UNIT
14 DECISION UNIT
15 OUTPUT UNIT
1000, 1000b, 1000c INFORMATION PROCESSING
SYSTEM
100, 100-1 FIRST AUTHENTICATION TERMINAL
100-2 SECOND AUTHENTICATION TERMINAL
110 CAMERA
120 STORAGE UNIT
130 COMMUNICATION UNIT
140 INPUT/OUTPUT UNIT
150 CONTROL UNIT
151 IMAGE-CAPTURING CONTROL UNIT
152 REGISTRATION UNIT
153 AUTHENTICATION CONTROL UNIT
154 DISPLAY CONTROL UNIT
155 SEAT REGISTRATION UNIT
400 TERMINAL
500, 500a, 500b, 500c INFORMATION PROCESSING
DEVICE
510 STORAGE UNIT
511, 511a, 511b, 511c PROGRAM
512 SEAT INFORMATION
5121 USER ID
5122 SEAT POSITION
513 EXIT INFORMATION
5131 SEAT POSITION
5132 EXIT TIME PERIOD
514 ENTRY INFORMATION
5141 SEAT POSITION
5142 ADVICE INFORMATION
520 MEMORY
530 IF UNIT
540 CONTROL UNIT
541, 541a FIRST BIOMETRIC INFORMATION
ACQUISITION UNIT

24

542, 542a FIRST AUTHENTICATION CONTROL
UNIT
543 DETERMINATION UNIT
544, 544b, 544c DECISION UNIT
545 OUTPUT UNIT
546 SEAT INFORMATION REGISTRATION UNIT
547 INFORMATION TRANSMISSION UNIT
548 SECOND BIOMETRIC INFORMATION ACQUI-
SITION UNIT
549 SECOND AUTHENTICATION CONTROL UNIT
5410 JUDGMENT UNIT
5411 PRIVILEGE PROVISION UNIT
600 AUTHENTICATION DEVICE
610 FACE INFORMATION DB
611 USER ID
612 FACE FEATURE INFORMATION
620 FACE DETECTION UNIT
630 FEATURE POINT EXTRACTION UNIT
640 REGISTRATION UNIT
650 AUTHENTICATION UNIT
N NETWORK
U USER
X FACILITY

What is claimed is:
1. An information processing device comprising:
at least one memory storing instructions and
at least one processor configured to execute the instruc-
tions to:
acquire biometric information about a user in a facility in
which a plurality of seats are disposed;
control first biometric authentication of the acquired bio-
metric information against registered biometric infor-
mation about a plurality of persons;
determine, based on seat information in which a seat
position of each person is associated with the registered
biometric information, the seat position of the user
when the first biometric authentication succeeds;
decide an exit time period recommended to the user as
assistance information for assisting in behavior at a
time of exit of the user, based on the seat position; and
output the assistance information.
2. The information processing device according to claim
1, wherein the at least one processor is further configured to
execute the instructions to:
decide, as the assistance information, the exit time period
recommended to the user, based on the seat position,
when the first biometric authentication succeeds,
acquire second biometric information about the user at
a gate of the facility;
control second biometric authentication of the second
biometric information being acquired at the gate
against the registered biometric information about
the plurality of persons; and
acquire the exit time period of the user when the second
biometric authentication succeeds, and judge
whether a current time is in the exit time period.
3. The information processing device according to claim
2, wherein
the facility includes a plurality of gates, and
the at least one processor is further configured to
execute the instructions to:
decide, as the assistance information, an exit gate and the
exit time period being recommended to the user, based
on the seat position, when the first biometric authenti-
cation succeeds, acquire the second biometric information at a time of exit of the user and information about a gate from which the user exits, and acquire the exit gate and the exit time period of the user when the second biometric authentication succeeds, and judge whether a current time is in the exit time period and the gate to be exited from is the exit gate.

4. The information processing device according to claim 3, wherein the seat information includes address information about each person, the address information is further associated with the registered biometric information, and the at least one processor is further configured to execute the instructions to:

determine the seat position and the address information about the user, based on the seat information, when the first biometric authentication succeeds, and decide the exit gate recommended to the user, based on the address information, when the first biometric authentication succeeds.

5. The information processing device according to claim 2, wherein the at least one processor is further configured to execute the instructions to:

provide a privilege to the user when a judgment result by the at least one processor is true.

6. The information processing device according to claim 2, wherein the at least one processor is further configured to execute the instructions to:

decide the exit time period, based on at least any of a past degree of congestion in the facility and a current degree of congestion.

7. The information processing device according to claim 2, wherein the at least one processor is further configured to execute the instructions to:

transmit content information to an information terminal possessed by the user until the exit time period.

8. The information processing device according to claim 1, wherein the seat information includes an attendance history to the facility of each user, the attendance history is further associated with the registered biometric information, and the at least one processor is further configured to execute the instructions to:

determine the attendance history of the user, and further output a message based on a determination result.

9. An information processing system comprising:

a first authentication terminal installed in a facility in which a plurality of seats are disposed; and an information processing device, wherein the information processing device comprises at least one memory storing instructions and at least one processor configured to execute the instructions to:

acquire biometric information about a user from the first authentication terminal, control first biometric authentication of the acquired biometric information against registered biometric information about a plurality of persons, determine, based on seat information in which a seat position of each person is associated with the registered biometric information, a seat position of the user when the first biometric authentication succeeds, decide an exit time period recommended to the user as assistance information for assisting in behavior at a time of exit of the user, based on the seat position, and output the assistance information.

10. The information processing system according to claim 9, further comprising a second authentication terminal installed at a gate of the facility, wherein the at least one processor is further configured to execute the instructions to:

decide, as the assistance information, an exit time period recommended to the user, based on the seat position, when the first biometric authentication succeeds, acquire second biometric information about the user from the second authentication terminal, control second biometric authentication of the second biometric information being acquired from the second authentication terminal against the registered biometric information about the plurality of persons, and acquire the exit time period of the user when the second biometric authentication succeeds, and judge whether a current time is in the exit time period of the user.

11. An information processing method comprising, by a computer:

acquiring biometric information about a user in a facility in which a plurality of seats are disposed;

controlling first biometric authentication of the acquired biometric information against registered biometric information about a plurality of persons;

determining, based on seat information in which a seat position of each person is associated with the registered biometric information, a seat position of the user when the first biometric authentication succeeds;

deciding an exit time period recommended to the user as assistance information for assisting in behavior at a time of exit of the user, based on the seat position; and outputting the assistance information.

12. A non-transitory computer-readable medium storing an information processing program causing a computer to execute:

processing of acquiring biometric information about a user in a facility in which a plurality of seats are disposed;

processing of controlling first biometric authentication of the acquired biometric information against registered biometric information about a plurality of persons;

processing of determining, based on seat information in which a seat position of each person is associated with the registered biometric information, a seat position of the user when the first biometric authentication succeeds;

processing of deciding an exit time period recommended to the user as assistance information for assisting in behavior at a time of exit of the user, based on the seat position; and processing of outputting the assistance information.

* * * * *